United States Patent
Nomura et al.

(10) Patent No.: US 7,636,088 B2
(45) Date of Patent: Dec. 22, 2009

(54) 3-DIMENSIONAL IMAGE CREATION DEVICE, 3-DIMENSIONAL IMAGE REPRODUCTION DEVICE, 3-DIMENSIONAL IMAGE PROCESSING DEVICE, 3-DIMENSIONAL IMAGE PROCESSING PROGRAM, AND RECORDING MEDIUM CONTAINING THE PROGRAM

(75) Inventors: Toshio Nomura, Hachioji (JP); Ryuji Kitaura, Sakura (JP); Kazuto Ohara, Funabashi (JP); Masahiro Shioi, Chiba (JP); Tadashi Uchiumi, Urayasu (JP)

(73) Assignee: Sharp Kabushiki Kaisha, Osaka (JP)

( * ) Notice: Subject to any disclaimer, the term of this patent is extended or adjusted under 35 U.S.C. 154(b) by 132 days.

(21) Appl. No.: 10/550,710

(22) PCT Filed: Apr. 16, 2004

(86) PCT No.: PCT/JP2004/005484

§ 371 (c)(1),
(2), (4) Date: Sep. 26, 2005

(87) PCT Pub. No.: WO2004/093467

PCT Pub. Date: Oct. 28, 2004

(65) Prior Publication Data

US 2006/0192776 A1 Aug. 31, 2006

(30) Foreign Application Priority Data

Apr. 17, 2003 (JP) .............................. 2003-112801
May 8, 2003 (JP) .............................. 2003-130711

(51) Int. Cl.
*G06T 15/00* (2006.01)

(52) U.S. Cl. ...................... 345/419; 345/422; 359/462; 382/154; 715/836; 715/838

(58) Field of Classification Search ................. 345/419, 345/422; 359/462; 382/154, 836, 838
See application file for complete search history.

(56) References Cited

U.S. PATENT DOCUMENTS

| 6,084,978 | A  | * | 7/2000 | Taylor et al. | ................. 382/154 |
| 6,268,880 | B1 | * | 7/2001 | Uomori et al. | ................. 348/47 |
| 6,507,358 | B1 | * | 1/2003 | Mori et al. | ................. 348/42 |
| 7,113,634 | B2 | * | 9/2006 | Yano | ........................... 382/154 |

(Continued)

FOREIGN PATENT DOCUMENTS

JP          07-050855 A          2/1995

(Continued)

*Primary Examiner*—Kimbinh T Nguyen
(74) *Attorney, Agent, or Firm*—Birch, Stewart, Kolasch & Birch, LLP

(57) ABSTRACT

An image signal composed of sequential frames is input to a 3-dimensional image creating apparatus, frame by frame. A controller (102) designates the presence/absence of reduction, the presence/absence of joining and 2D select. An image converter (101) creates image data in the format designated by the presence/absence of reduction and the presence/absence of joining. A 3D information creator (103) creates 3D information necessary for displaying the image as a 3-dimensional image by formatting the presence/absence of reduction, the presence/absence of joining and 2D select. A multiplexer (104) converts image data and 3D information in a predetermined format and outputs them to the outside. In this way, it is possible to make the image data for 3-dimensional display versatile and select an arbitrary viewpoint image efficiently.

12 Claims, 30 Drawing Sheets

U.S. PATENT DOCUMENTS

| | | |
|---|---|---|
| 2001/0033327 A1 | 10/2001 | Uomori et al. |
| 2005/0210145 A1* | 9/2005 | Kim et al. .................. 709/231 |

FOREIGN PATENT DOCUMENTS

| | | |
|---|---|---|
| JP | 08-009421 A | 1/1996 |
| JP | 08-317429 A | 11/1996 |
| JP | 09-074573 | 3/1997 |
| JP | 09-121370 A | 5/1997 |
| JP | 10-221775 A | 8/1998 |
| JP | 10-336705 | 12/1998 |
| JP | 11-041627 A | 2/1999 |
| JP | 11-191895 A | 7/1999 |
| JP | 2000-078615 A | 3/2000 |
| JP | 2001-281754 A | 10/2001 |
| JP | 2001-337994 A | 12/2001 |
| JP | 2001-359122 A | 12/2001 |
| JP | 2002-232913 | 8/2002 |
| JP | 2002-232914 A | 8/2002 |
| JP | 2002-300403 A | 10/2002 |
| JP | 2002-300405 A | 10/2002 |
| JP | 2003-009185 A | 1/2003 |
| JP | 2003-043599 | 2/2003 |
| JP | 2003-111101 A | 4/2003 |

* cited by examiner

FIG. 3
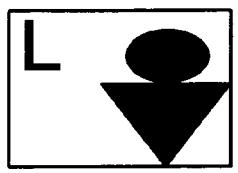
(a)
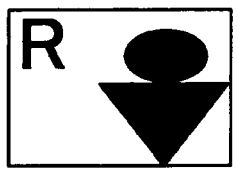
(b)
FIG. 4
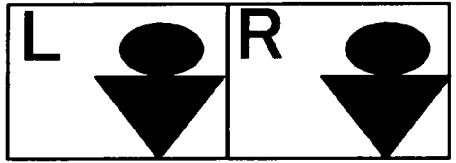
(a)
(b)
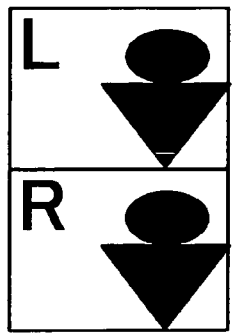
(c)
(d)
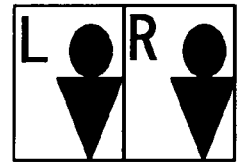
(e)
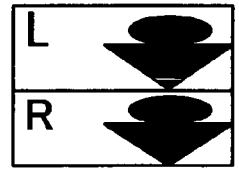
(f)

(a)

(b)

| Presence/absence of joining |
| --- |
| Presence/absence of reduction |
| Number of viewpoints in the horizontal direction |
| Number of viewpoints in the vertical direction |
| 2D select |
| Presence/absence of joining |
| Order of images |
| 1st viewpoint |
| ⋮ |
| $K^{th}$ viewpoint |

| |
|---|
| Presence/absence of joining |
| Presence/absence of reduction |
| Number of viewpoints in the horizontal direction |
| Number of viewpoints in the vertical direction |
| 2D select |
| Placement mode |
| Viewpoint number |

FIG. 12

| |
|---|
| Presence/absence of joining = unjoined |
| Presence/absence of reduction = no reduction |
| Number of viewpoints in the horizontal direction = 2 |
| Number of viewpoints in the vertical direction = 1 |
| 2D select = 1 |
| Viewpoint number = 1 |

( a )

| |
|---|
| Presence/absence of joining = unjoined |
| Presence/absence of reduction = reduced |
| Number of viewpoints in the horizontal direction = 2 |
| Number of viewpoints in the vertical direction = 1 |
| 2D select = 1 |
| Viewpoint number = 2 |

| |
|---|
| File configuration |
| $1^{st}$ viewpoint number |
| $1^{st}$ filename |
| $2^{nd}$ viewpoint number |
| $2^{nd}$ filename |
| ⋮ |
| $K^{th}$ viewpoint number |
| $K^{th}$ filename |

FIG. 14
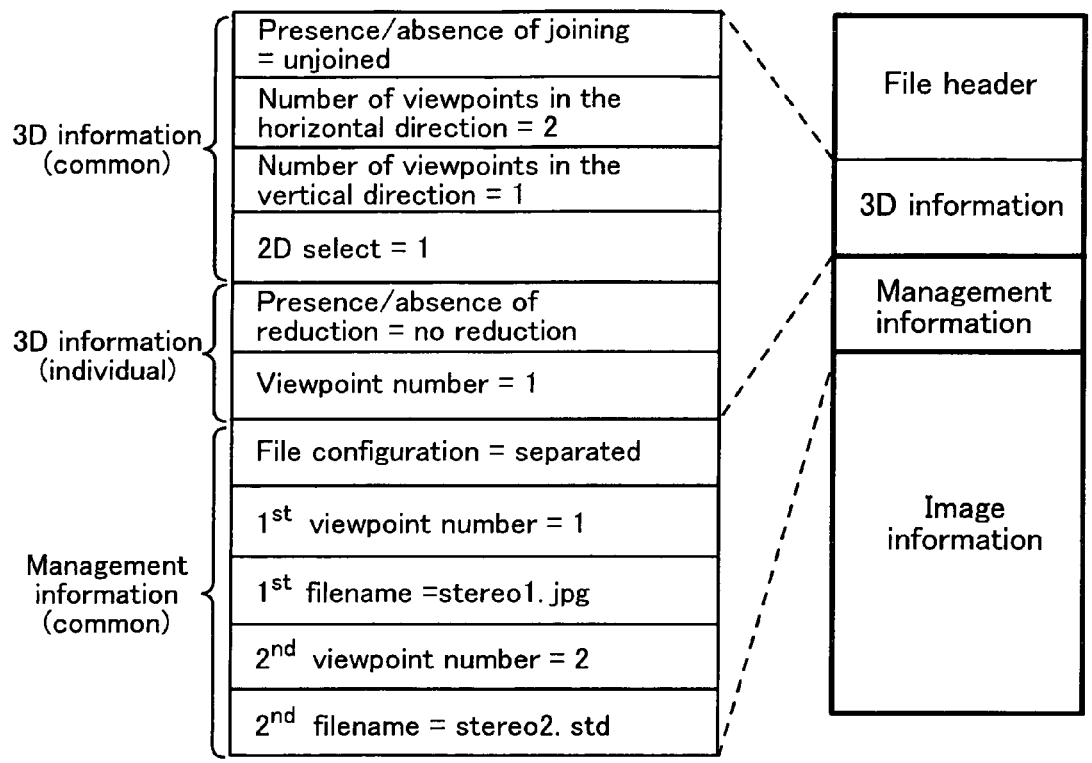
(a)
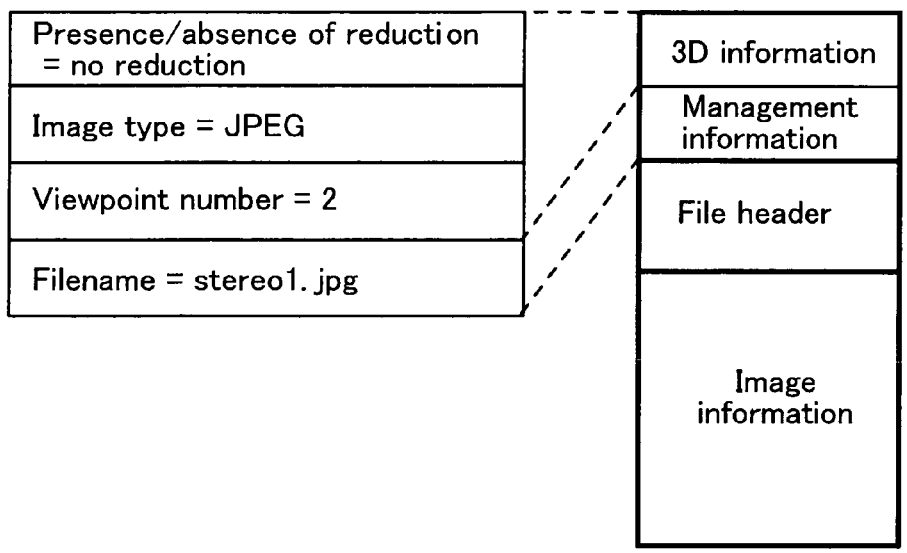
(b)

PRIOR ART
FIG. 16
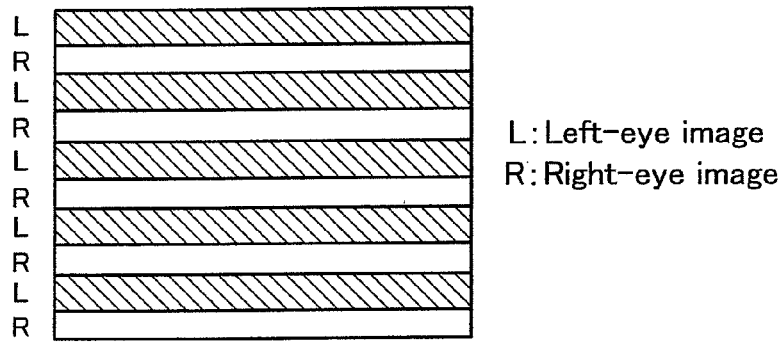
L: Left-eye image
R: Right-eye image
PRIOR ART
FIG. 17
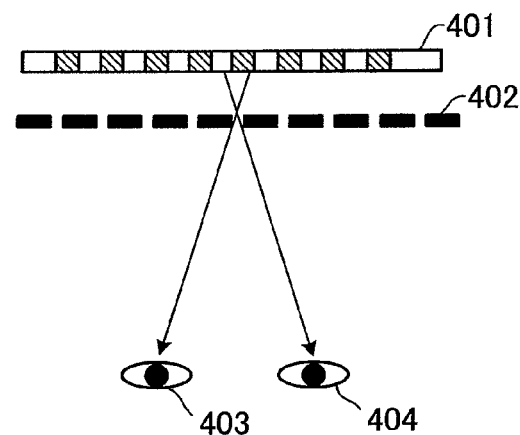
(a)
PRIOR ART
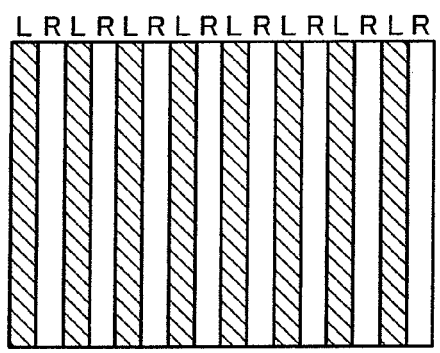
(b)

FIG. 18
PRIOR ART
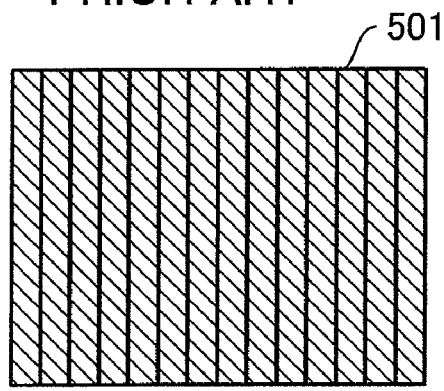
(a)
PRIOR ART
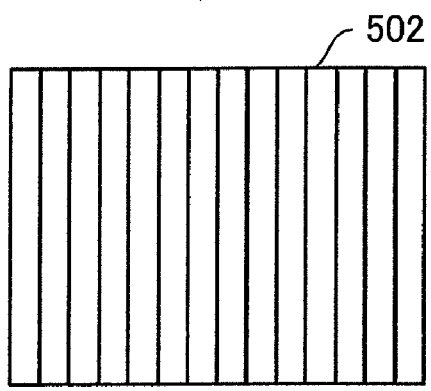
(b)
PRIOR ART
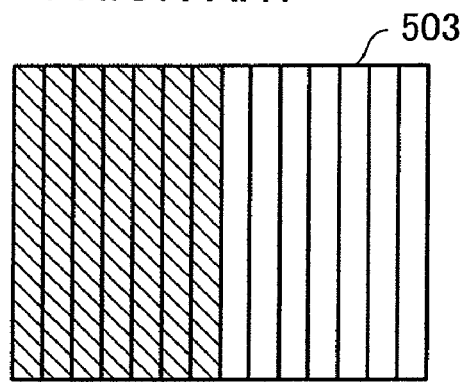
(c)

FIG. 21
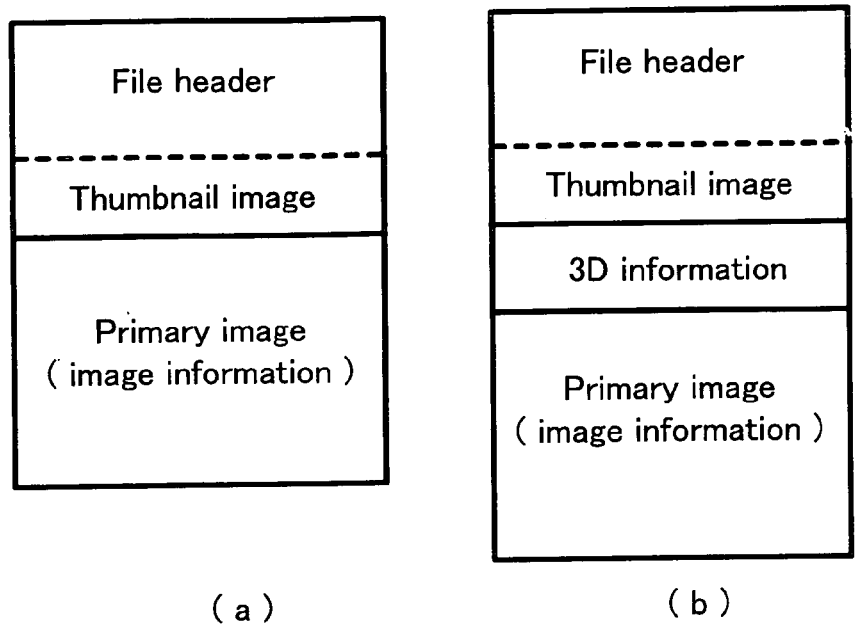
(a)　　　(b)
FIG. 22
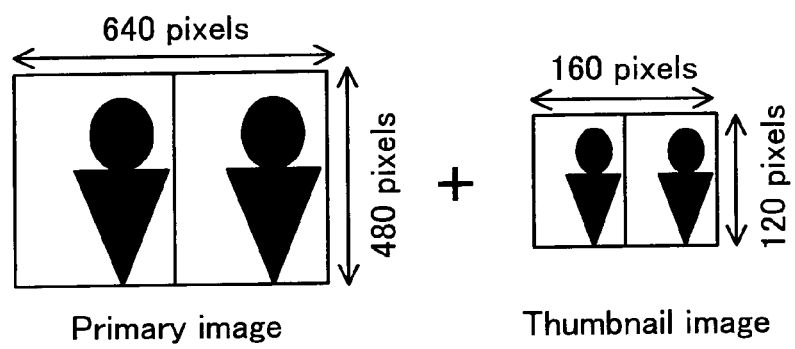
(a)
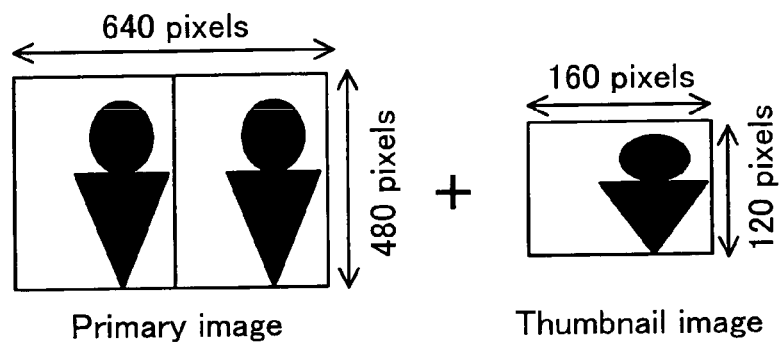
(b)

FIG. 23
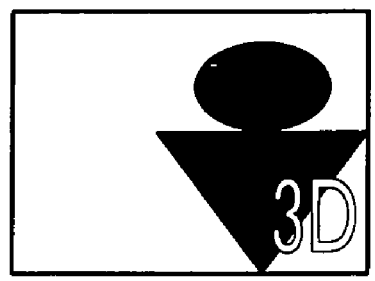
(a)
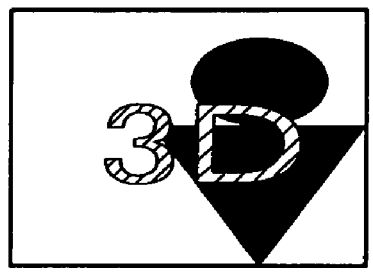
(b)
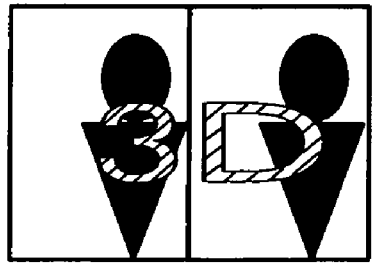
(c)

FIG. 24
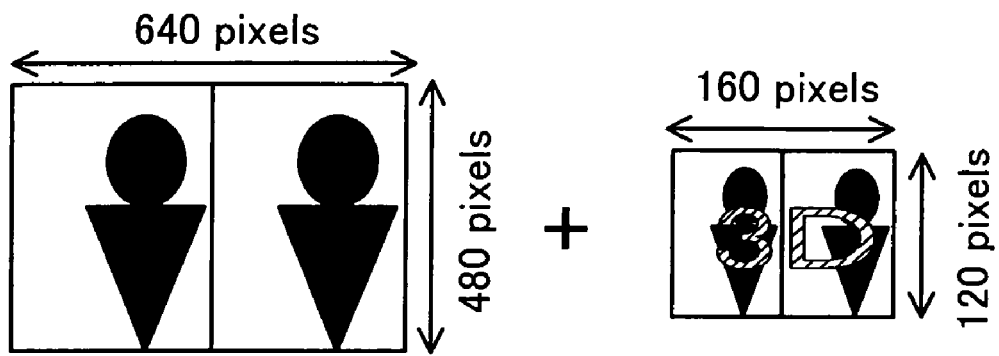
(a)
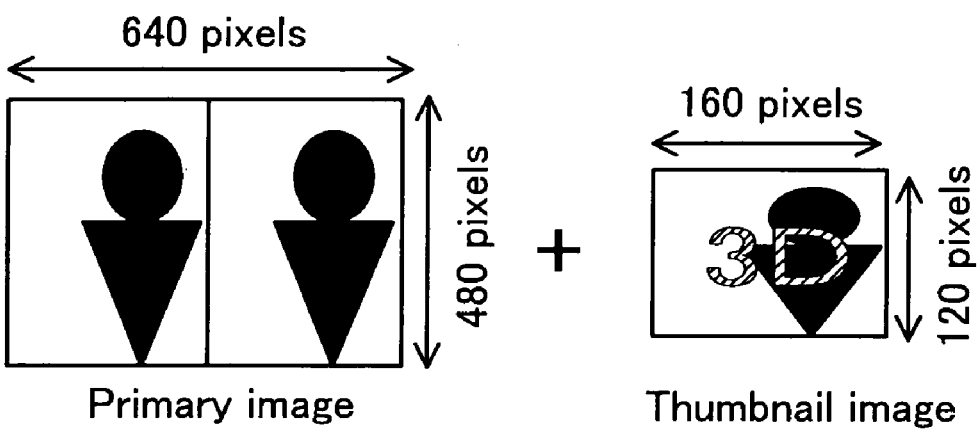
(b)

FIG. 25
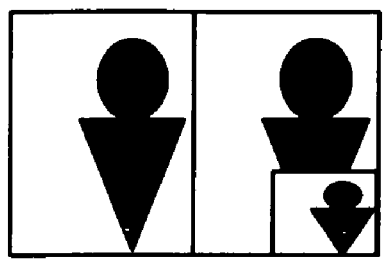
(a)
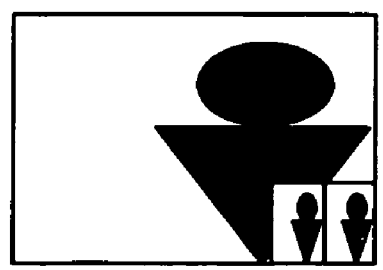
(b)
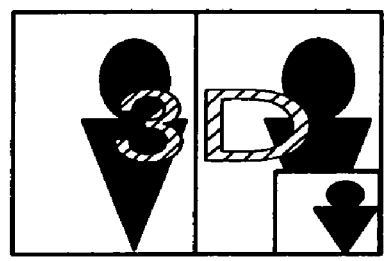
(c)
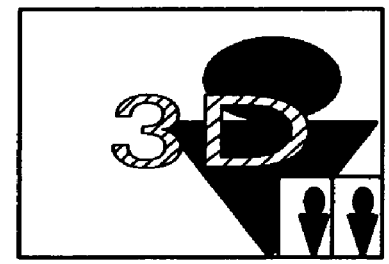
(d)

3-DIMENSIONAL IMAGE CREATION DEVICE, 3-DIMENSIONAL IMAGE REPRODUCTION DEVICE, 3-DIMENSIONAL IMAGE PROCESSING DEVICE, 3-DIMENSIONAL IMAGE PROCESSING PROGRAM, AND RECORDING MEDIUM CONTAINING THE PROGRAM

TECHNICAL FIELD

The present invention relates to a 3-dimensional image creating apparatus for adding attribute information to image data when image data for 3-dimensional display is created and also relates to a 3-dimensional image reproducing apparatus for reproducing the data.

The present invention also relates to a 3-dimensional image processing apparatus, a 3-dimensional image processing program and a recording medium recorded with the program, which are aimed at, being able to warn the user about that status when the parallax quantity varies due to enlargement or reduction in size of 3-dimensional images so that there is a fear that it becomes difficult to show the magnified 3-dimensional images to a stereoscopic image or to present a stereoscopic effect, and making correction if the stereoscopic effect can be reformed.

BACKGROUND ART

Conventionally, various methods have been proposed which display 3-dimensional images. Of these, "binocular methods" using binocular parallax are generally used. Specifically, a stereoscopic view is achieved by providing left and right-eye images having binocular parallax and projecting them separately on the left and right eyes, respectively.

FIG. 16 is a conceptual view for illustrating a "alternating-field system" as one of the typical binocular methods.

In this alternating-field system, the left-eye image and right-eye image are interlaced on alternate horizontal lines of one pixel as shown in FIG. 16, so that the left-eye image and right-eye image will be switched and displayed alternately. The left-eye image and right-eye image therefore have half the vertical resolution compared to that in normal 2-dimensional display mode. An observer should put on shutter glasses that open and close in synchronism with the switching period of the display. The shutter used here opens the left-eye side and closes the right-eye side when the left-eye image is displayed and closes the left-eye side and opens the right-eye side when the right-eye image is displayed. With this arrangement, the left-eye image is observed by the left eye alone while the right-eye image is observed by the right eye alone, to achieve stereoscopic view.

FIG. 17 is a conceptual view for illustrating another typical scheme of the binocular methods, namely "parallax barrier system".

FIG. 17(a) is a view showing the principle of the cause of parallax. FIG. 17(b) is a view showing an image frame displayed in the parallax barrier system.

In FIG. 17(a), an image in which the left-eye image and right-eye image are interlaced on alternate vertical lines of one pixel as shown in FIG. 17(b), is displayed on an image display panel 401 while a parallax barrier 402 with slits having a slit width smaller than the interval between the pixels for an identical viewpoint is placed in front of image display panel 401, whereby the left-eye image is observed by the left eye 403 alone while the right-eye image is observed by the right eye 404 alone, to achieve stereoscopic view.

Incidentally, there is another method, the "lenticular system" for achieving 3-dimensional display of an image as shown in FIG. 17(b), which is similar to the parallax barrier system. One example of a recording data format used in the lenticular system is disclosed by Japanese Patent Application Laid-open Hei 11-41627.

FIG. 18 is a conceptual view showing one example of a recording data format of the lenticular system. A left-eye image 501 as shown in FIG. 18(a) and a right-eye image 502 as shown in FIG. 18(b) are each thinned to half with respect to the horizontal direction, forming and recording a frame of complex image 503 as shown in FIG. 18(c). Upon reproduction, this complex image 503 is rearranged to form a composite image as shown in FIG. 17(b).

Although not limited to 3-dimensional images, Japanese Patent Application Laid-open No. 2001-337994 discloses a method of storing additional information for identification of a thumbnail image and displaying the additional information laid over the thumbnail image on a display device.

In the above way, in the method of achieving stereoscopic view by letting the left and right eyes observe different images, it is possible to practice comfortable stereoscopic view when the distance of counterpart points of the left and right images (will be called parallax, hereinbelow) falls within a certain fixed range. However, as the parallax becomes greater, the images for both eyes will not merge into a stereoscopic view. The magnitude of the parallax at that point, has been reported by, for example "a tentative plan of guidelines for 3-dimensional images" published in 2002 by The Mechanical Social Systems Foundation.

Japanese Patent Application Laid-open 2000-78615 and Japanese Patent Application Laid-open Hei 10-221775 disclose methods of achieving easy display of a 3-dimensional image, when its binocular images are hard to merge into a stereoscopic view due to the magnitude of the above parallax, by shifting the displayed positions of left and right images on a stereoscopic display so as to adjust the parallax.

As stated above, in conventional 3-dimensional display systems, recording of data is done in a fixed recording data format so as to be suited to the display scheme determined on the playback apparatus side, hence no consideration has been taken to make recording data versatile.

A 3-dimensional display involves various necessary information such as the method of thinning of image, the number of viewpoints in a so-called "multi-view scheme" and the like other than the display scheme, these information are not recorded as the recorded data when a single display scheme is used. It is true that if only one identical display scheme is always used, it is not necessary to record these information at all, but the versatility of recording data is markedly reduced because of this. Just referring to the limited cases where data for the parallax barrier system (or the lenticular system) is to be recorded, the left-eye image and right-eye image may be recorded as separate sequences, the data may be recorded as a mixed image in which the left-eye image and right-eye image are arranged horizontally half-and-half in one frame as shown in FIG. 18(c), or the data may be recorded as a composite image in which the left-eye image and right-eye image are interlaced on alternate vertical lines of one pixel as shown in FIG. 17(b). Naturally, data of different recording formats should be handled by different displaying processes, but since it is impossible to know the format of data from the recorded data, there is a problem in that it is impossible to know how the data should be processed for display when a third person gets the data.

Further, in the prior art, no consideration has been taken for recording image data from different viewpoints independently from each other so as to facilitate readout and reproduction of a desired viewpoint image only.

In the prior art, no sufficient consideration has been given to interchangeability with existing apparatus, either. Specifically, in a system disclosed in Japanese Patent Application Laid-open 2001-337994, the display systems capable of interpreting additional information alone have been handled, but the additional information is not useful for display systems that cannot interpret it.

Moreover, when a 3-dimensional image based on the above prior art is enlarged or reduced, the amount of protrusion and the amount of depth of the 3-dimensional image change, hence there occurs a problem that a desired stereoscopic effect cannot be obtained.

Referring first to FIGS. 39 and 40, description hereinbelow will be made briefly on the principle of a stereoscopic display for presenting a stereoscopic view by displaying separate images for the left and right eyes. Both of these drawings are schematic top views showing cases where a user having a binocular distance d is observing a stereoscopic display 1.

Generally, suppose that d[m] represents the distance between eyes of a user, D[m] the distance from the user to stereoscopic display 1, W[m] the width of the display, P[dot] the resolution of the display and l (alphabetical letter l) [dot] the distance between left and right counterpart points of a 3-dimensional image.

Then, the amount of protrusion z [m] when a 3-dimensional image protrudes forward is given by $$z=(l \times W/P) \times D/(d+(l \times W/P)) \quad \text{Eq. (1).}$$

The amount of depth z [m] when a 3-dimensional image sets back is given by $$z=(l \times W/P) \times D/(d-(l \times W/P)) \quad \text{Eq. (2).}$$

The parallax θ is given by $$\theta = \tan^{-1}(1/2D) \times 2 \quad \text{Eq. (3).}$$

With this stereoscopic display, when a 3-dimensional image is enlarged or reduced, the extent of disparity between the left and right images changes, hence the resultant image changes in stereoscopic effect. This will be described referring to the 3-dimensional image before enlargement in FIG. 39(a) and the 3-dimensional image after enlargement in FIG. 39(b). When a 3-dimensional image having a protrusion forwards from the stereoscopic display as shown in FIG. 39(a) is enlarged, the amount of protrusion becomes greater as shown in FIG. 39(b). Here, l' represents the left and right counterpart points after enlargement and z' the amount of protrusion after enlargement.

On the other hand, when a 3-dimensional image having an setback interior-ward from the stereoscopic display as shown in FIG. 40(a) is enlarged and displayed, the amount of depth becomes greater, and with some magnification ratio, it becomes impossible to present a stereoscopic view because the views of the left and right eyes do not fuse. In contrast, when a 3-dimensional image is reduced in size, the disparity between the left and right images becomes smaller, the amount of protrusion or the amount of depth becomes smaller, presenting a weak stereoscopic effect.

In this way, when a 3-dimensional image is enlarged or reduced, the stereoscopic effect varies as that protrusion becomes greater because the parallax becomes greater when the image is enlarged and conversely depth becomes smaller because the parallax becomes smaller when the image is reduced. Therefore, if a 3-dimensional is enlarged or reduced in the same manner as a usual 2-dimensional image, there occurs a problem that a desired stereoscopic view cannot be obtained causing confusion or the uncomfortable stereoscopic view causes a strain on the eyes.

The present invention has been devised in order to solve the above problems, it is therefore an object of the present invention to provide a 3-dimensional image creating apparatus which can make the image data for 3-dimensional display versatile and permits efficient selection of an arbitrary viewpoint image as well as providing a 3-dimensional image reproducing apparatus for reproducing the data.

It is another object of the present invention to provide a 3-dimensional image processing apparatus, a 3-dimensional image processing program and a recording medium recorded with the program, which can give warning to the user and make correction so as to provide a comfortable stereoscopic view when the parallax quantity varies due to enlargement or reduction in size of a 3-dimensional image so that there is a fear that it becomes difficult to obtain a stereoscopic view or the stereoscopic effect.

DISCLOSURE OF INVENTION

The present invention is a 3-dimensional image creating apparatus comprising: a primary image creator for creating a primary image of image information for multiple viewpoints; a thumbnail image creator for creating a thumbnail image; a 3-dimensional control information creator for creating 3-dimensional control information for implementing 3-dimensional display of the primary image; and a multiplexer for multiplexing the primary image, the thumbnail image and the 3-dimensional control information.

Here, the thumbnail image creator is characterized by creating the thumbnail image by directly reducing the primary image, creating the thumbnail image by extracting a section of one viewpoint image from the primary image, embedding a symbol that indicates an inclusion of a 3-dimensional image into the thumbnail image, or creating the thumbnail image made up of a reduced image of the primary image and a reduced image of one viewpoint image extracted from the primary image and fitted therein in a picture-in-picture manner.

Further, the present invention is a 3-dimensional image reproducing apparatus, comprising: a demultiplexer for separating a primary image data, a thumbnail data and a 3-dimensional control information from an input image data; and a thumbnail creator for outputting a thumbnail with a symbol that indicates an inclusion of a 3-dimensional image overlaid on the thumbnail data when the primary image data represents a 3-dimensional image.

The present invention is a 3-dimensional image processing apparatus, comprising: a parallax range acquisition means for acquiring a parallax range in which a stereoscopic view is permitted; a parallax quantity acquisition means for acquiring a parallax quantity of a 3-dimensional image; and a decision means for deciding whether the parallax quantity of the 3-dimensional image falls within the parallax range.

Further, a 3-dimensional image processing apparatus, includes: a parallax range acquisition means for acquiring a parallax range in which a stereoscopic view is permitted; a parallax quantity acquisition means for acquiring a parallax quantity of a 3-dimensional image; a ratio acquisition means for acquiring a ratio for enlargement or reduction of the 3-dimensional image; and a decision means for deciding whether the parallax quantity of the 3-dimensional image that has been enlarged or reduced based on the ratio falls within the parallax range.

Here, the decision means is characterized by making a deciding process based on a partial area of the 3-dimensional image.

The present invention is characterized by including a warning means for warning a user or a parallax adjustment means for adjusting the parallax quantity of the 3-dimensional image when the decision means determines that the parallax quantity falls out of the parallax area.

Here, the parallax quantity acquisition means is characterized by usage of a resolution and/or size of a stereoscopic display for displaying the 3-dimensional image. Also, the parallax range acquisition means is characterized by usage of the capability of separating left and right images of a stereoscopic display for displaying the 3-dimensional image. Also, the parallax quantity acquisition means is characterized by usage of data previously tagged to the 3-dimensional image.

Further, the present invention is a 3-dimensional image processing program characterized by making the computer function as each of the aforementioned means.

Moreover, the present invention is a computer readable recording medium having the above-described programs recorded therein.

According to the present invention, 3-dimensional control information for 3-dimensional display of the primary image is created, and the primary image, its thumbnail image and the 3-dimensional image control information are multiplexed, whereby it is possible to output the thumbnail image for efficient check of the image content when the primary image is a 3-dimensional image.

According to the present invention, creating the thumbnail image by directly reducing the primary image makes it possible to provide display of the thumbnail image in 3-dimension.

According to the present invention, creating the thumbnail image by extracting the section of one viewpoint image from the primary image makes it possible to display the thumbnail image without distortion.

According to the present invention, embedding the symbol that shows the inclusion of the 3-dimensional image into thumbnail images, enables even a conventional 3-dimensional image reproducing apparatus that cannot interpret 3-dimensional control information, to make a selected file distinctive as a 3D file from its thumbnail.

According to the present invention, creating the thumbnail image made up of a reduced image of the primary image and the reduced image of one viewpoint image extracted from the primary image and fitted therein in a picture-in-picture manner, makes it possible to check both the image content from the distortion-free image and the image configuration of the actual record of the primary image at the same time.

According to the present invention, when the data of the primary image represents the 3-dimensional image, the image with the symbol that indicates the inclusion of the 3-dimensional image overlaid on the thumbnail data is output as the thumbnail. It is thereby possible to show whether the selected file is 2D or 3D from its thumbnail.

According to the present invention, since it is decided whether the parallax quantity of the 3-dimensional image falls within the parallax range for permitting the stereoscopic view, it is possible to take countermeasures against the case when the stereoscopic view is impossible. Examples of the countermeasures include warning to the user and the parallax quantity adjustment of the 3-dimensional image. Further, when the 3-dimensional image is enlarged or reduced, it is decided whether the parallax quantity of the 3-dimensional image falls within the parallax range for permitting the stereoscopic view, and if the result shows difficulty in providing the stereoscopic view, it is possible to take the measures.

Moreover, when the stereoscopic view is hard to achieve, it is possible to adjust the parallax so as to provide as comfortable as possible stereoscopic view by taking into account the parallax quantity (e.g., the maximum amount of protrusion and maximum amount of depth) from the whole or part of the 3-dimensional image and the parallax range that permits comfortable stereoscopic view on the stereoscopic display.

As described heretofore, according to the present invention, the user is allowed to properly check the content of 3-dimensional images and the user is presented with the content of 3-dimensional images even if they are enlarged or reduced, whereby it is possible to provide the 3-dimensional image reproducing apparatus or image data processing apparatus which allows for comfortable observation of 3-dimensional images.

BRIEF DESCRIPTION OF DRAWINGS

FIG. 3 is a diagram showing examples of how viewpoint numbers are allotted.

FIG. 4 is a diagram showing examples of joining for two viewpoints.

FIG. 11 is a diagram showing a 3D information format example.

FIG. 12 is a diagram showing one example of 3D information set values.

FIG. 13 is a diagram showing a management information format example.

FIG. 14 is a diagram showing one example when image data at multiple viewpoints are recorded in separate files.

FIG. 16 is a diagram showing an image display format in an alternating-field system.

FIG. 17 is a diagram for illustrating the concept of a parallax barrier system.

FIG. 18 is a diagram for illustrating the image display format in a parallax barrier system.

FIG. 21 is a diagram showing image file formats for recording thumbnail image data for 3-dimensional display.

FIG. 22 is a diagram showing combinations of a primary image and a thumbnail image, reduced to 160 pixels×120 pixels.

FIG. 23 is a diagram showing thumbnail images in which a symbol that indicates the inclusion of 3D image data is embedded.

FIG. 24 a diagram showing combinations of a primary image and a thumbnail image in which a symbol that indicates the inclusion of 3D image data is embedded.

FIG. 25 is a diagram showing examples of thumbnails represented in a picture-in-picture manner.

BEST MODE FOR CARRYING OUT THE INVENTION

The embodiments of the present invention will hereinbelow be described with reference to the drawings.

THE FIRST EMBODIMENT

Figure 1:
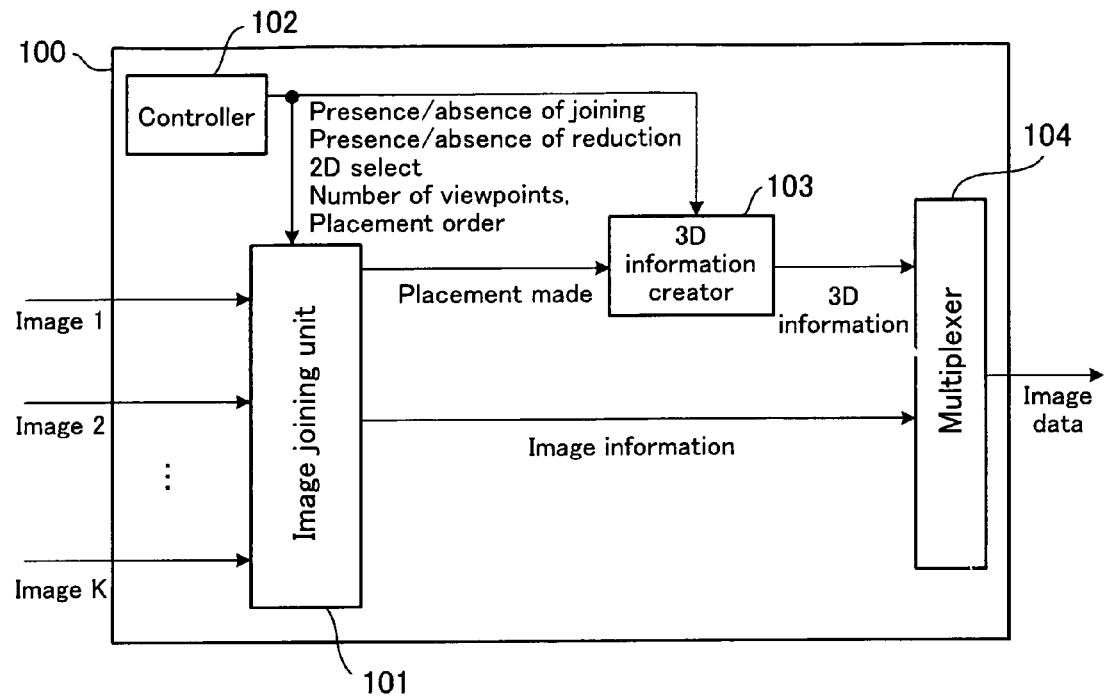
FIG. 1 is a diagram showing a 3-dimensional image creating apparatus in the first embodiment.

FIG. 1 is a block diagram showing a configuration of a 3-dimensional image creating apparatus in accordance with the first embodiment. In FIG. 1, a 3-dimensional image creating apparatus 100 includes: an image joining unit 101 for determining the placement mode of images 1 to K viewed from multiple viewpoints (K represents the number of viewpoints, here K is an integer equal to or greater than 2) and generating an joined image by joining these images contiguous to each other; a controller 102 for selecting whether images 1 to K are to be joined (presence/absence of joining), whether images 1 to K are to be reduced in size (presence/absence of reduction), one image to be used for 2-dimensional display (2D select) and the number of viewpoints and the image placement order; a 3D information creating unit 103 for creating 3D information by formatting the presence/absence of reduction, the presence/absence of joining, the image placement mode, the 2D select and the information of the number of viewpoints; and a multiplexer 104 having a means for having access to recording media and communications lines and multiplexing image information and 3D information and outputting the image data.

The operation of the thus configured 3-dimensional image creating apparatus 100 will be described.

An image signal composed of continuous frames is input to the 3-dimensional image creating apparatus, frame by frame. Here, imaging devices for input of images to 3-dimensional image creating apparatus 100 are arranged in a gridlike fashion within a plane, with M units horizontally and N units vertically, and each imaging device is allotted with a number (viewpoint number) (here, M and N are integers equal to or greater than 1).

Figure 2:
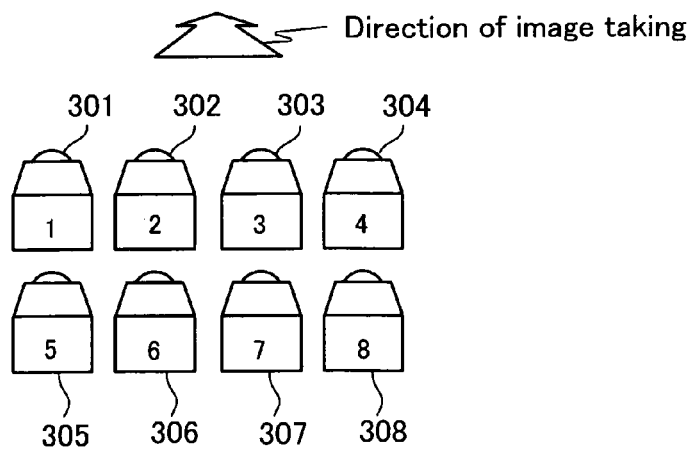
FIG. 2 is a diagram showing a setup example of imaging devices for multiple viewpoints.

FIG. 2 shows a setup example of 8 viewpoints (a view in which the arrayed imaging devices are viewed from the above rear). Here, the viewpoint numbers are assigned from left to right and top to bottom. Specifically, 1 is assigned to imaging device 301, 2 to imaging device 302, 3 to imaging device 303 and 4 to imaging device 304. Similarly, 5 to 8 are assigned to imaging devices 305 to 308, respectively. In all the embodiments, the image taken by the imaging device designated by the viewpoint number k should be called image k (k is an integer equal to or greater than 1).

Controller 102 designates the presence/absence of reduction, the presence/absence of joining, 2D select, the number M of viewpoints in the horizontal direction and the number N of viewpoints in the vertical direction and the image placement order. Here, the presence/absence of reduction takes a value for "reduced" or "no reduction", and the presence/absence of joining takes a value for "unjoined" or "joined". The 2D select takes a value of the viewpoint number or a value for "none designated". As to the image placement order, the order of images is designated with the viewpoint numbers. The number of viewpoints should have M=4 and N=2, in the example of FIG. 2.

It is assumed that when the presence/absence of joining, input from controller 102 indicates "unjoined", image joining unit 101 should output images 1 to K that have been input in parallel, sequentially in accordance with the image placement order designated by controller 102. Alternatively, it is also possible to set up such that the output of the viewpoint images is always started from that of the viewpoint number designated by the 2D select.

Image joining unit 101 selects placement mode of input images 1 to K when the presence/absence of joining indicates "joined". There can be three kinds of placement modes: horizontal placement in which multi-view images are arranged horizontally; vertical placement in which multi-view images are arranged in the top and bottom direction; and gridlike placement in which multi-view images are arranged in both the horizontal and vertical directions.

Here, the placement mode of the images may or may not be in agreement with the setup manner of the imaging devices. When the placement of the images is in agreement with the setup manner of the imaging devices, M=1 and N≧2 produces vertical placement, M≧2 and N=1 produces horizontal placement, and other cases produce gridlike placement. For the cases where the placement is not in agreement, it is possible to adapt such that either the vertical placement or the horizontal placement can be selected when M=1 and N≧2 or M≧2 and N=1.

Once the placement mode is determined, the images are joined in accordance with the image placement order input from controller 102. FIG. 3 shows examples of image placement orders when the images taken by imaging devices shown in FIG. 2 are arranged in a gridlike fashion. In FIG. 3, each cell represents one image and the numerals indicate viewpoint numbers. FIG. 3(a) shows a case where the image placement order is designated to be 1, 2, 3, 4, 5, 6, 7 and 8, or the same order as that of the viewpoint numbers assigned to the imaging devices. FIG. 3(b) shows a case where the image placement order is designated to be 2, 3, 1, 4, 6, 7, 5 and 8.

If the presence/absence of reduction input from controller 102 shows "reduced", the input image of each viewpoint is reduced. Upon reduction, the reduction ratio is not fixed but should be determined based on the number of viewpoints. Specifically, the image is reduced to 1/M in the horizontal direction and 1/N in the vertical direction.

Figures 5, 6:
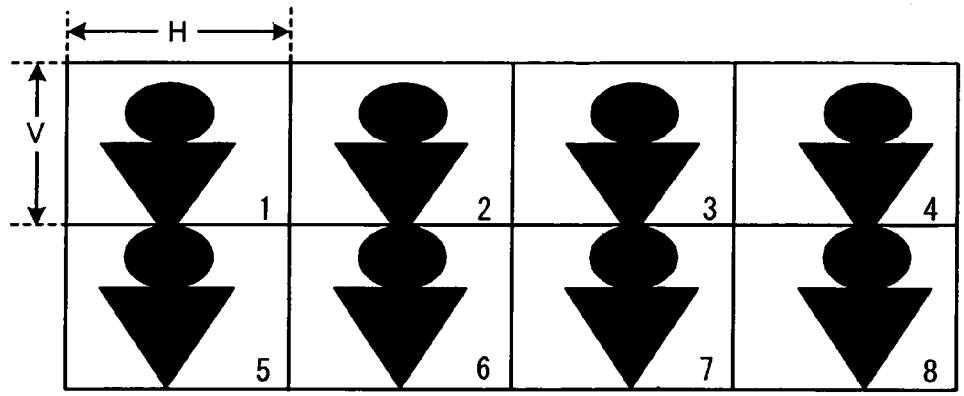
FIG. 5 is a diagram showing grid-like placements of multi-view images.
FIG. 6 is a diagram showing a format example of 3D information.

FIGS. 4 and 5 show examples of the results of joining by image joining unit 101. FIG. 4 shows the cases of two viewpoints, designated by, for example, the viewpoint Nos. 1 and 2, of the imaging devices shown in FIG. 2. FIG. 5 shows a case where all the imaging devices are used.

FIG. 4(a) shows a case with "no reduction" and "unjoined"; FIG. 4(b) shows a case with "no reduction" and "joined (horizontal placement)"; FIG. 4(c) shows a case with "no reduction" and "joined (vertical placement)"; FIG. 4(d) shows a case with "reduced" and "unjoined"; FIG. 4(e) shows a case with "reduced" and "joined (horizontal placement)"; and FIG. 4(f) shows a case with "reduced" and "joined (vertical placement)". Here, for the cases with "reduced", the horizontal or vertical resolution is reduced to half by thinning the pixels or the like.

FIG. 5 shows examples of gridlike placement of multi-view images, in particular, a case where the presence/absence of reduction indicates "no reduction" is shown in FIG. 5(a). Here, H and V represent the number of pixels in the horizontal direction, and the number of lines in the vertical direction, of each viewpoint image before reduction. A case where the presence/absence of reduction indicates "reduced" is shown in FIG. 5(b). The reduction ratio is 1/4 with respect to the horizontal direction and 1/2 with respect to the vertical direction, the image after reduction is composed of H pixels in width and V lines in height, so that it is the same in size as each viewpoint image before reduction. As to the image arrangement, the images are arranged in the same manner as the imaging devices are set up, with four images in the horizontal direction and two images in the vertical direction. Here, the numerals attached to the images indicate the viewpoint numbers. The images are arranged in the ascending order of the viewpoint number: the upper left is the image (viewpoint No. 1) taken by imaging unit 301 and the lower right is the image (viewpoint No. 8) taken by imaging unit 308.

Description herein was made with the reduction ratios in the horizontal and vertical directions fixed, but these may be varied. When the reduction ratio is variable, it should be recorded in the 3D information. When the presence/absence of joining indicates "unjoined", the reduction ratio may be designated for every image at each viewpoint.

Three-dimensional information creating unit 103 creates 3D information by formatting the presence/absence of reduction, the presence/absence of joining, 2D select, the number of viewpoints in the horizontal direction and the number of viewpoints in the vertical direction, the image placement order and the placement mode.

FIG. 6 shows one example of 3D information of this case. Here, the order of images indicates that the images are arranged either in "viewpoint number order" or "arbitrary order". After this, a plurality of viewpoint numbers are recorded. These viewpoint numbers indicate the way the images are arranged in the joined image when the presence/absence of joining indicates "joined". In the example shown in FIG. 3(b), the first viewpoint number is 2 and followed by 3, 1, 4, 6, 7, 5 and 8. When the presence/absence of joining shows "unjoined", the order indicates the order in which the images of information are multiplexed. When the order of images indicates "viewpoint number order", these viewpoint numbers can be omitted. To create 3D information, the set values may be used as they are, or may be encoded by fixed length coding or by variable length coding.

Multiplexer 104 converts image information, 3D information and management information into data in a predetermined format and outputs it to the outside. When the images are not joined, the order of output from image joining unit 101 is in agreement with the image placement order designated by controller 102 as stated above. Therefore, the image information is also multiplexed in the image placement order. Though not illustrated in FIG. 1, if voice sound and music are to be multiplexed, data for these is also multiplexed at multiplexer 104.

THE SECOND EMBODIMENT

Figure 19:
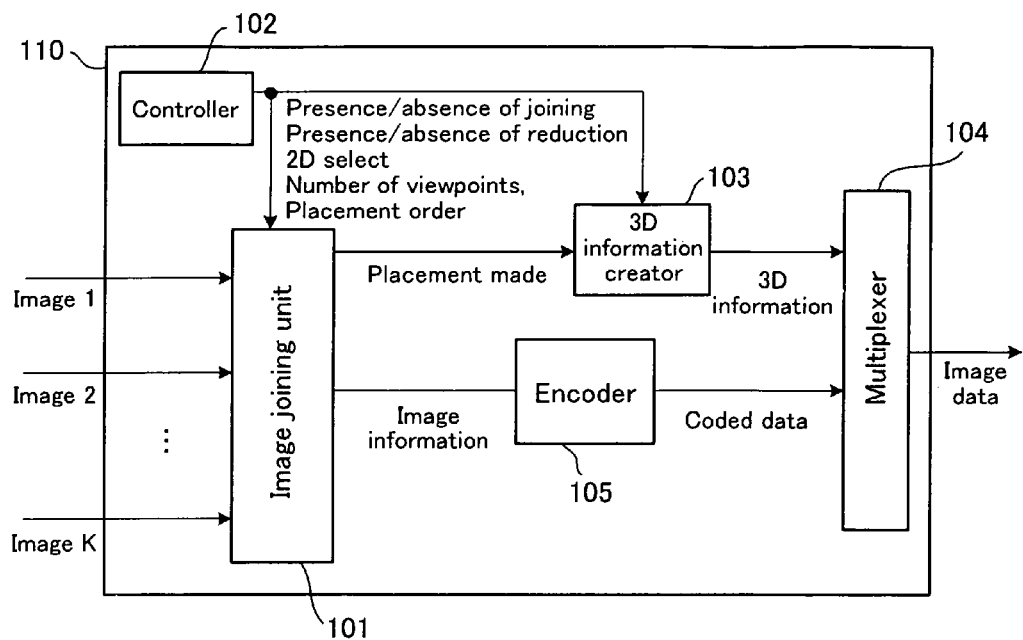
FIG. 19 is a diagram showing a configuration of a 3-dimensional image creating apparatus in the second embodiment.

Here, input to multiplexer 104 may be coded image information. FIG. 19 shows a configuration of a 3-dimensional image creating apparatus 110 dealing with this case. The 3-dimensional image creating apparatus 110 differs from the 3-dimensional image creating apparatus 100 shown in FIG. 1, in that it includes an encoder 105.

The output from multiplexer 104 is connected to recording devices such as IC memories, magneto-optical disks, magnetic tape, hard disks and the like, and/or communications devices such as LAN, modems and others. Here, it is assumed that an IC memory is connected to multiplexer 104. Next, the recording format used in this case will be described.

Generally, when an IC memory is used as a recording medium, a file system such as FAT (File Allocation Table) etc., is constructed on the IC memory and data is recorded as a file. As the file format used herein an existing one or a newly defined unique format may be used.

Figure 7:
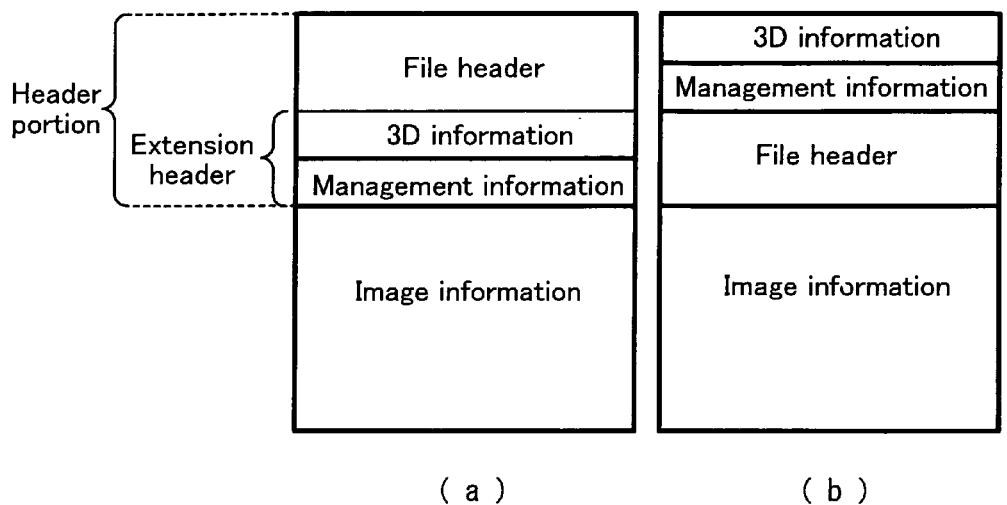
FIG. 7 is a diagram showing file formats of image data.

FIG. 7 is a diagram showing a file format for recording image data. In FIG. 7, it is assumed that data is recorded into a file, in the order from the top to bottom in the figure. FIG. 7(a) shows a case where an existing format is used; and FIG. 7(b) shows one example where a new format is used.

When an existing format is used, 3D information is to be recorded as part of the existing header portion, using a general function of extending the header portion provided for the existing format. Here, the extended header is called an extension header. For example, a file header corresponds to an application data segment in JPEG, hence a new application data segment is defined to record 3D information. In MPEG-4, a file header corresponds to a Visual Object Sequence or/and Video Object Layer, so that 3D information is recorded as user data into these.

When an existing format is used, generally used extensions should be employed directly. For example, an extension ".jpg" is used generally in a case of a JPEG file; an extension ".mpg" or ".mp4" is used generally in a case of a MPEG file; and an extension ".wmv" is used generally in a case of WMV (Windows®Media Video). This makes it possible for even a conventional player having no 3D image display function to recognize the file as a file of an existing format and display it as a 2-dimensional image.

On the other hand, when a new format is employed, 3D information may be recorded, for example, at the beginning of the file as shown in FIG. 7(b). Further, in order to have the file understood to be a new format file, a unique extension that makes it distinguishable from the files of existing formats should be added. The management information in FIGS. 7(a) and 7(b) should be used for recording some information such as date of creation, creator and the like, which does not directly relate to the 3-dimensional image.

Figure 8:
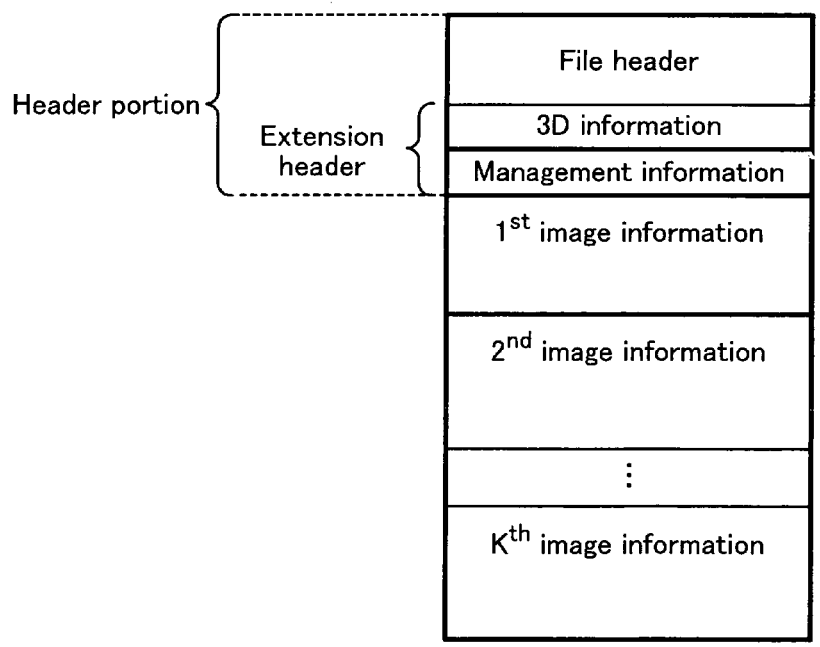
FIG. 8 is a diagram showing one format example when image data is stored in a file of an existing format.

To begin with, how multi-view images are stored when the presence/absence of joining indicates "unjoined" will be described. When a file having the existing format shown in FIG. 7(a) is used, a plurality of images viewed from multiple viewpoints are separately recorded in the image information area in FIG. 7(a). When a motion picture is recorded, a plurality of frames of data are recorded for each viewpoint. FIG. 8 shows a stored example of this case. For a motion picture, multiple frames of data are recorded for each viewpoint. In this case, each frame may be coded independently from one another as in Motion JPEG, or the differences may be coded by using inter-frame prediction as in MPEG-4.

A case where a file having a new format shown in FIG. 7(b) is used will be described. In use of a new format, there are two cases, one which employs an existing format (JPEG, bitmap, etc.) for the file header and the image information part in FIG. 7(b), and one which employs a quite new unique format. Accordingly, in order to clarify the difference in format, classification information (called image type) should be recorded in the 3D information.

Figure 9:
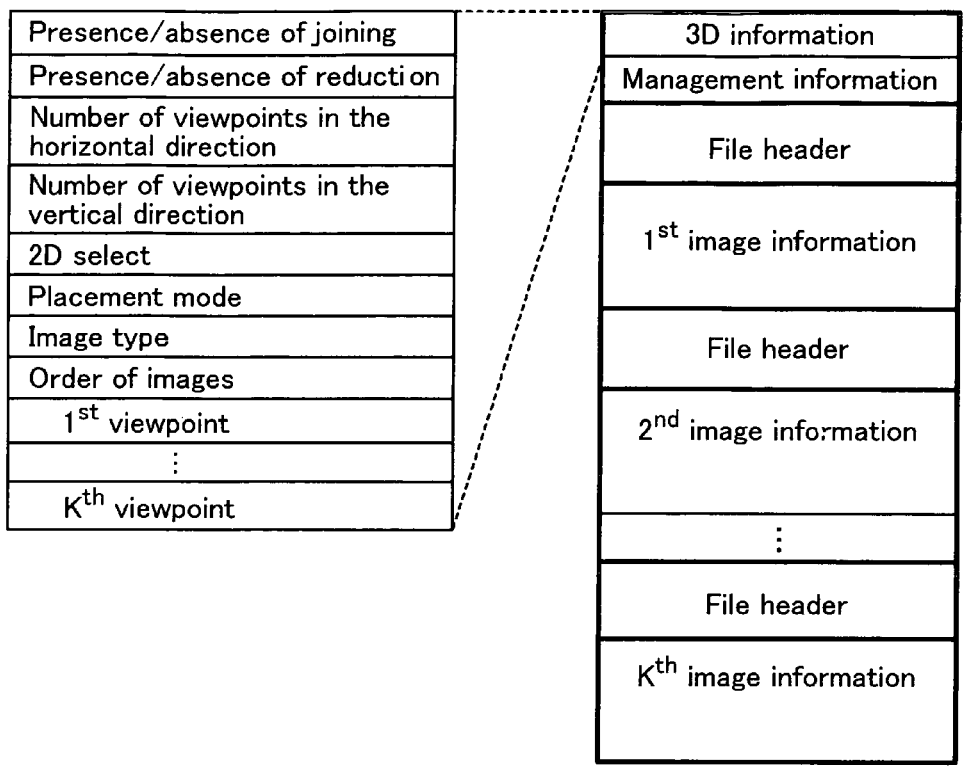
FIG. 9 is a diagram showing one format example when image data is stored in a file of a new format.

Referring to the way in which image data is recorded, a plurality of images data at multiple viewpoints are recorded in the image information area in FIG. 7(b). In a case of a motion picture, a plurality of frames of data are recorded for each viewpoint. FIG. 9 shows a storage example and 3D information example when the presence/absence of joining indicates "unjoined". K pieces of file headers and image information in FIG. 9 are formatted so that each part can be recognized as a file of an existing format. When specifically describing it taking an example of bitmap files, images 1 to K each are recorded as independent bitmap files, and the format is configured so that 3D information, management information, the bitmap file of image 1 to the bitmap file of image K are connected sequentially.

Figure 10:
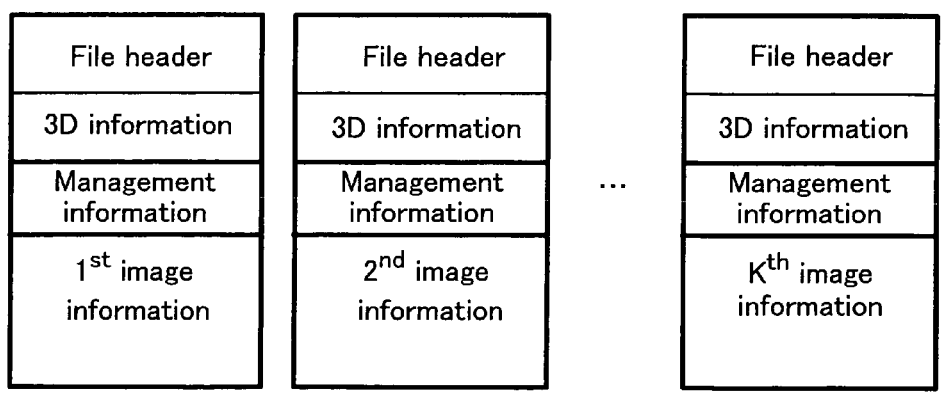
FIG. 10 is a diagram showing a storage example of image data when image data at multiple viewpoints are recorded in separate files.

Here, when the presence/absence of joining indicates "unjoined", image information as to multiple viewpoints may be recorded as separate files of image data. In this case, the image information for each viewpoint can be recorded in a format shown in FIG. 7(a) when using an existing format and in a format shown in FIG. 7(b) when using a new format. When the files are recorded, the existing format or new format alone may be used, or both the formats may be mixed and used. FIG. 10 shows an example where an existing format is employed. Since there are K viewpoints, K files are created.

In this case, 3D information creating unit 103 creates as much 3D information as the number of viewpoints. Here, since one image information is recorded in a single file, the order of images is omitted and the viewpoint number that shows the correspondence between the file and the viewpoint number is to be recorded. FIG. 11 shows one example of 3D information of this case.

FIG. 12 is a diagram showing one example of 3D information when the number of viewpoints is 2. Here, it is assumed that among the imaging devices shown in FIG. 2, the imaging devices designated by viewpoint Nos. 1 and 2 are used. Since the number of viewpoints is 2, two 3D information shown in FIGS. 12(a) and (b) are created. The left side of "=" shows the items of 3D information and the right side shows the corresponding set values. Of all the items, the same values are recorded in both FIGS. 12(a) and 12(b), for the placement mode, the number of viewpoints in the horizontal direction and the number of viewpoints in the vertical direction and 2D select. Other items than these are different: specifically, FIG. 12(a) shows that the image has a viewpoint number of 1 and is not reduced in size, and FIG. 12(b) shows that the image has a viewpoint number of 2 and is reduced.

When image information at multiple viewpoints is recorded as separate files, among a number of recorded files, it is necessary to identify a file corresponding to a viewpoint from multi-view images taken by an identical imaging apparatus. Here, it is possible to adapt multiplexer 104 in FIG. 1, for example, to record the information for identifying the files of different viewpoint images taken by an identical same imaging apparatus, into the aforementioned management information. FIG. 13 is a diagram showing one example of management information of this case, wherein information that shows relationship between multi-view image files and the names recorded on the recording medium is recorded. In FIG. 13, the file configuration takes a value for "separated" or "integrated": "separated" indicates that each of viewpoint images is recorded as a separated file while "integrated" indicates that all the viewpoint images are recorded in one file. In order to acquire the knowledge of the filename of image data from the viewpoint number, each viewpoint number is recorded in correspondence to the filename.

In addition, in order to show the multi-view images taken by the imaging devices to belong to the same group, filenames can be assigned in accordance with a predetermined naming rule. For example, in the aforementioned case having two viewpoints, a group consisting of image 1 and image 2 may be assigned with filenames of "stereo1_1.jpg" and "stereo1_2.jpg", and another group of images may be assigned with filenames of "stereo2_1.jpg" and "stereo2_2.jpg", so as to make distinction from each other.

In addition, there is redundancy in the 3D information or the management information recorded in the associated files. For instance, in the example of 3D information as shown in FIG. 12, other than the presence/absence of reduction and the viewpoint number, identical information are presented. In the management information example sown in FIG. 13, the content of management information is common to all the files.

Accordingly, these common information (common information) may be recorded into a single file only and the other files may be adapted to be recorded with the information (individual information) inherent to image data of their own. FIG. 14 shows an example of this case. FIG. 14(a) shows a file having individual information and common information recorded therein. FIG. 14(b) shows a file having individual information alone. In this example, the file of FIG. 14(a) is recorded in an existing format and the file of FIG. 14(b) is recorded in a new format, so that the file extensions can be used to distinguish the file recorded with common information from the other files recorded with individual information only. In addition, the filename of the file recorded with common information may be recorded as individual management information as shown in FIG. 14(b). This structure facilitates to distinguish the file recorded with common information from files recorded with individual information alone.

Here, other than the above, distinction between these files can be also achieved by making the image file of each viewpoint distinguishable from the others using the aforementioned naming rule, and recording common information to an image file having a particular viewpoint number, such as that designated by the 2D select.

Alternatively, redundant information may be integrated to create a management file while each image file is adapted to be recorded with inherent information alone. The management file should have a unique extension different from that of the image files.

Additionally, a file system such as the aforementioned FAT uses directories so as to manage files en bloc. It is also possible to record a group of created image files of different viewpoints (which may include its management file if any) in the same directory.

When the presence/absence of joining indicates "joined", the image information of one integrated image is recorded in the image information area in FIG. 7(a) and FIG. 7(b). For a motion picture, a plurality of images, each made up of joined frames corresponding to multi-view images, are recorded.

Though the above embodiment is configured so that the placement order of images can be changed arbitrarily while the way of assignment of the viewpoint numbers is fixed, the way of assignment of the viewpoint numbers may be changed arbitrarily while the placement order of images is fixed. Further, the arrangement of imaging devices is not limited to gridlike arrangements, but they can be arranged arbitrarily. In this case, a reference imaging device (whose viewpoint number is set at 1) is selected, and the position is expressed by a coordinate system having the position of the reference device as an origin. The positional coordinates of the imaging device at each viewpoint are recorded into 3D information, in the order of viewpoint number.

In the above embodiment, the file of a new format is configured so that 3D information and management information are recorded at the beginning of the file, however, files of a new format are not limited to this. The storage position of these may be located after the file header or after image information, or may be the same as the existing format shown in FIG. 7(a).

THE THIRD EMBODIMENT

Next, a reproducing apparatus for displaying the image data created by 3-dimensional image creating apparatus 100 as 3-dimensional image will be described.

Figure 15:
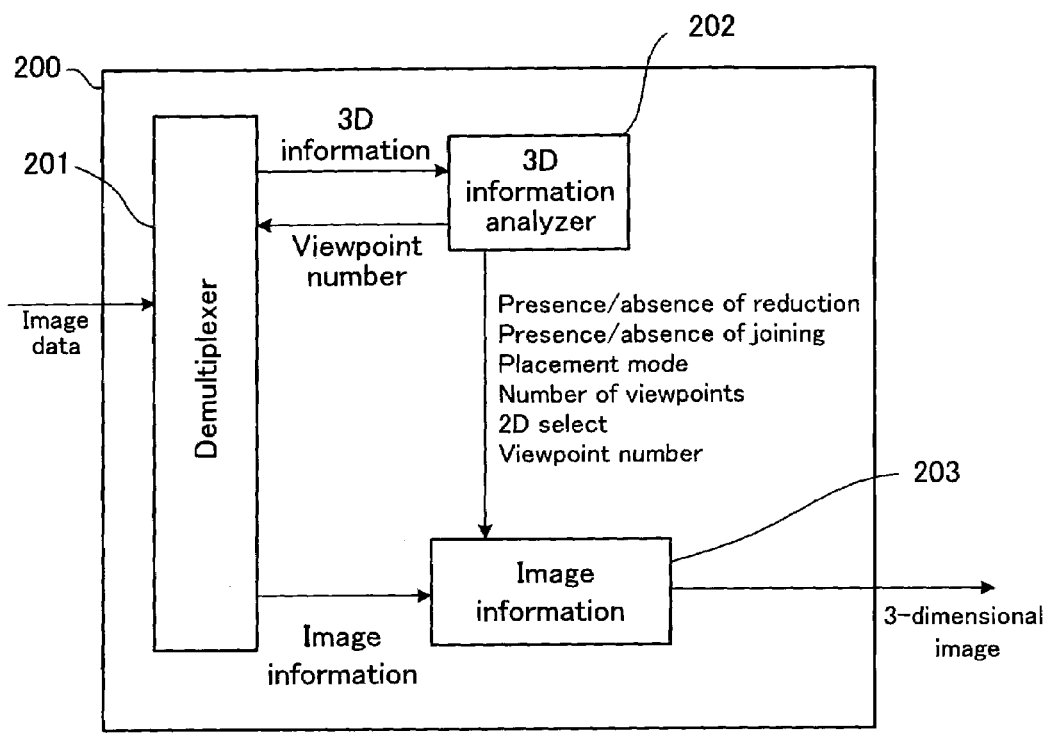
FIG. 15 is a diagram showing a configuration of a 3-dimensional image reproducing apparatus in the third embodiment.

FIG. 15 is a block diagram showing a configuration of a 3-dimensional image reproducing apparatus in accordance with the embodiment of the present invention. In FIG. 15, a 3-dimensional image reproducing apparatus 200 is comprised of a demultiplexer 201, a 3D information analyzer 202 and an image converter 203.

Demultiplexer 201 reads image data which has been multiplexed in the predetermined format, from a recording device or a communications device and separates it into image information, 3D information and management information. Though not illustrated in FIG. 15, when voice sound and/or music have been multiplexed, these data are also separated through demultiplexer 201.

Three-dimensional information analyzer 202 analyzes the 3D information in the predetermined format and extracts the set value for each item.

Connected to image converter 203 may be various types of display devices having different display formats, such as 2-dimensional display devices using ordinary CRTs, liquid crystal panels, stereoscopic display devices using lenticular technology, parallax barrier technology, time-division method, etc.

Concerning the thus configured 3-dimensional image reproducing apparatus 200, its operation will be explained. Here, it is assumed that an IC memory is connected to demultiplexer 201. As already stated, image files in an existing format and in a new format as well as management files are recorded in the IC memory. Distinction between image files and management files can be made from their file extensions. Here, it is assumed that the user selects one image file or management file via an unillustrated selecting means.

To begin with, a case where the selected file is an image file will be described. Since, in this case, distinction between the existing format and the new format can be made from their file extensions, demultiplexer 201 reads out 3D information from the extension area of the file header when the file to be reproduced is an existing format file shown in FIG. 7(a). When the file is that of a new format shown in FIG. 7(b), 3D information is read out from the beginning of the file.

Three-dimensional information analyzer 202 analyzes the 3D information and extracts the set values for the presence/absence of joining, presence/absence of reduction, the number of viewpoints, placement mode, 2D select and others. It also determines the viewpoint numbers of the images for displaying a 3-dimensional image. To display a 3-dimensional image from multi-view image data, images at two viewpoints presenting parallax should be selected from the multi-view images and may be put to use for the left-eye and right-eye images. For example, in case of the images of data recorded by the imaging devices shown in FIG. 2, a horizontally arranged pair of devices, such as 1 and 2, 1 and 3, 1 and 4, 2 and 3, 2 and 4, and others, can be selected. If the images are rotated 90 degrees upon display, pairs of devices 1 and 5, 2 and 6, 3 and 7 and 4 and 8, may be selected to achieve display of a 3-dimensional image.

When the presence/absence of joining indicates "unjoined", the selected file is either recorded with image information at one viewpoint only as shown in FIG. 10 or with unjoined separate image information for all the viewpoints as shown in FIG. 8.

Distinction between these can be done by checking whether the 3D information contains the information as to the order of images, based on the analyzed result of the 3D information. If the 3D information contains the order of images, the file is the latter one, and from the first to K-th viewpoint numbers recorded in the 3D information, an arbitrary combination of viewpoints allowing for a stereoscopic view should be selected. Otherwise, the file is the former one, and another viewpoint number which is able to produce a stereoscopic view in combination with the viewpoint number i (here i is an integer equal to or greater than 1) recorded in the 3D information is selected. The selected viewpoint numbers are output to demultiplexer 201.

Demultiplexer 201 reads out the image information designated by the input viewpoint numbers from the file, and outputs it to image converter 203. If the image information at the input viewpoint numbers is not found in the file, a file that has the image information recorded therein should be located with the aid of the management information and naming rule as stated above and read out.

It is also possible to refer the file configuration in the management information in order to check whether the file has a record of only one viewpoint image or a record of images of all viewpoints. If the file configuration shows "separated", image information of one viewpoint image is recorded and if it shows "integrated", image information of all viewpoints is recorded.

On the other hand, when the presence/absence of joining indicates "joined", the file has a record of only a single joined image, it is therefore possible to select arbitrary viewpoint numbers. In this case, the viewpoint numbers are output to image converter 203.

THE FOURTH EMBODIMENT

Figure 20:
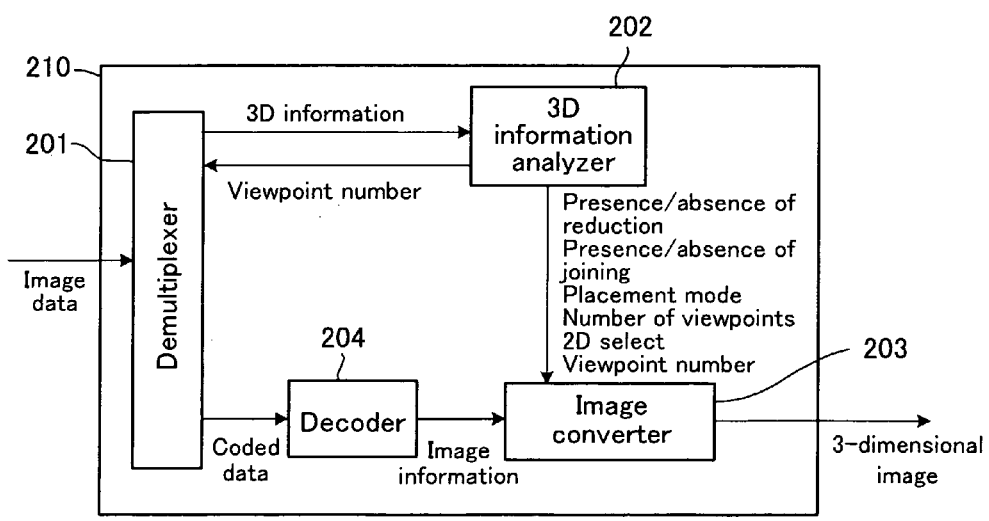
FIG. 20 is a diagram showing a configuration of a 3-dimensional image reproducing apparatus in the fourth embodiment.

At this point, when image information has been coded, the data should be decoded after demultiplexing. FIG. 20 shows a configuration of a 3-dimensional image reproducing apparatus 210 for this case. Three-dimensional image reproducing apparatus 210 differs from the 3-dimensional image reproducing apparatus 200 in FIG. 15 by the inclusion of a decoder 204.

Image converter 203 converts the image information separated by demultiplexer 201 into a display format, in accordance with the presence/absence of joining, presence/absence of reduction, the number of viewpoints, placement mode, 2D select and the viewpoint numbers, input from 3D information analyzer 202. In this process, if the presence/absence of joining indicates "unjoined", conversion will be started when all image information designated by the viewpoint numbers have been extracted. If any of the image information cannot be obtained due to file deletion or other reasons, the image designated at a viewpoint number closest to the original number may be used in place or, 2-dimensional display may be implemented. When the presence/absence of joining indicates "joined", the viewpoint images designated by the viewpoint numbers are cut out from the joined image and converted.

Referring to conversion into a display format, for example, if a parallax barrier display device is connected to 3-dimensional image reproducing apparatus 200, the form shown in FIG. 4(e) is easiest to handle. In this case, vertical lines of one pixel from the left and right images are rearranged alternately in the horizontal direction. In the case of FIG. 4(b), the left and right images are each thinned to half with respect to the horizontal before rearranging vertical lines of one pixel alternately in the horizontal direction. In either case, the image data is attached with 3D information, so that it is possible to convert the data into a display format that is suitable for the display device.

Here, taking an example of a parallax barrier system to refer the case where image information is encoded, the coding efficiency can be markedly improved when encoding is carried out for the image having an arrangement shown in FIG. 4(e), even if the actual image to be displayed is that shown in FIG. 17(b). This is because the state shown in FIG. 4(e) has a higher correlation between adjacent pixels than that of the state shown in FIG. 17(b). To apply the encoded data of the image of FIG. 4(e) to a parallax barrier system, in 3-dimensional image reproducing apparatus 210 of FIG. 20 the data should be decoded into its image form by decoder 204 first, then the image should be rearranged by image converter 203 into the form shown in FIG. 17(b).

If the operation mode is switched to the 2-dimensional display mode while a 3-dimensional image is being displayed, the image of the viewpoint number designated by 2D select is displayed. At this point, if the presence/absence of reduction shows "no reduction", the image is directly displayed. In the case of "reduced", the image is enlarged twofold and displayed. When, however, the image is not being displayed, one of the images being displayed may be selected and displayed. This selection can be done by, for example, selecting one with the least or greatest viewpoint number, one that is closest in the distance, with respect to the arrangement of the imaging devices or in the joined image, to the image of the viewpoint number designated by 2D select, one being used for the left-eye image, one being used for the right-eye image, or any other method. Here, the selection is not particularly limited. If no image for 2-dimensional display is selected by 2D select, the image to be displayed is selected by a predetermined method.

When a 2-dimensional display apparatus is connected, the image designated by 2D select is displayed. The display is done in the same manner as 2-dimensional display in the 3-dimensional display device.

When the file selected by the user is a management file, the presence/absence of joining recorded in the 3D information must show "unjoined"; an arbitrary combination of viewpoint numbers that allow for a stereoscopic view may and should be selected. The operation from the readout of image data from the image files to the conversion into the display format is the same as that described above, so that description is omitted herein.

Now that the above embodiment was explained referring to a case where the viewpoint numbers and filenames are recorded in the management information, it is also possible to provide a following configuration. That is, 3-dimensional image creating apparatus 100 is configured to record an identification number that indicates that image information belongs to a group of multi-view images taken by the same imaging apparatus, into both the common information and the individual information, and 3-dimensional image reproducing apparatus 200 is configured to read out image information only when both the filename and identification number are consistent. The same identification number may be assigned to a group of multi-view images or a different number may be assigned to each viewpoint. This configuration can provide prevention against malfunction due to fabrication of a filename.

As stated heretofore, since various kinds of data created by different 3-dimensional imaging schemes can be handled in a unified manner, and since 2-dimensional images can be displayed correctly on conventional players having no 3-dimensional image display function, it is possible to provide versatility.

There are some cases where a thumbnail image is recorded in the image file as shown in FIG. 21(a). According to the DCF (Design rule for Camera File system) standard, established to ensure the interchangeability of image files, in order to secure the least interchangeability for reproduction in case of failing to reproduce the primary image (image information), storage of a thumbnail image is stipulated. In the DCF standard, no limitation is imposed on the pixel size of the primary image, but the pixel size of the thumbnail image is limited to one kind, 160 pixels×120 pixels.

To record a file of information for 3-dimensional display along this idea, the format shown in FIG. 21(b) can be considered. That is, the file has a form in which 3D information is added to an image file having a format of FIG. 21(a), and the primary image in FIG. 21(b) is supposed to be a 3D image.

Here, it is assumed that an image, as shown in FIG. 4(e), made up of two viewpoint images, each reduced to half in the horizontal direction and joined to each other, is stored as the primary image in FIG. 21(b), and that the pixel size is 640 pixels×480 pixels. It is also assumed that an image directly reduced from the primary image, down to 160 pixels×120 pixels, is used as the thumbnail image. Under the above assumption, the resultant file contains images as shown in FIG. 22(a). In this case, the primary image and the thumbnail image can be said to be given in 3D image forms.

Accordingly, when a file with images as shown in FIG. 22(a) is given, a 3-dimensional image reproducing apparatus capable of interpreting 3D information and achieving 3D display, is able to provide a thumbnail display as shown in FIG. 23(c), by overwriting the information that indicates that the file holds 3D data, on the thumbnail image. It is also possible to display the thumbnail in 3D by converting the thumbnail image in the same manner as the primary image is converted when it is displayed in 3D. Moreover, when the symbol (the characters "3D" in FIG. 23(c), for example) that indicates the inclusion of a 3D image may be given with a parallax to achieve 3D display, it is possible to enhance the visibility.

When a thumbnail is given in 3D display, use of a thumbnail image shown in FIG. 22(a) enables high-speed rendering compared to the case when a decoded primary image is reduced and used for 3D display. This is because a thumbnail image is small, hence can be decoded quickly, unlike the case where a large image, i.e., the primary image, initially needs to be decoded.

Here, since it is not necessary that the thumbnail image is one that is directly reduced from the primary image, a combination of a primary image with a thumbnail image as shown in FIG. 22(b) is also possible. The primary image in FIG. 22(b) is the same as in FIG. 22(a) while the thumbnail image is an image, obtained by extracting the section of one viewpoint image from the primary image and reduced down to 160 pixels×120 pixels. In FIG. 22(b), since the primary image is contracted to half in the horizontal direction, or in other words, the ratio between the horizontal scale and vertical scale is 1:2, the thumbnail image should be created by extracting the section of one viewpoint image and enlarging it twice in the horizontal direction.

When a file with images as shown in FIG. 22(b) is given, a 3-dimensional image reproducing apparatus capable of interpreting 3D information and achieving 3D display, is able to provide a thumbnail display as shown in FIG. 23(b), by overwriting the information that indicates that the file holds 3D data, on the thumbnail image. Preparation of a thumbnail image by extracting the section of one viewpoint image from the primary image as shown in FIG. 22(b) enables quick thumbnail display free from distortion.

Even when a thumbnail image as shown in FIG. 22(a) is given, it is possible to display a thumbnail as shown in FIG. 23(b) by extracting the section of one viewpoint upon thumbnail display, magnifying it twice in the horizontal direction, then overwriting the information for 3D storage indication, on the thumbnail image.

Though FIG. 22 shows a case where the presence/absence of joining in the primary image indicates "joined", the primary image may be composed of "unjoined" images as shown in FIG. 4(a). When the presence/absence of joining of the primary image shows "unjoined", one of a plurality of images recorded for the primary image can be reduced and recorded as a thumbnail image. Alternatively, whether the presence/absence of joining of the primary image shows "joined" or "unjoined", one viewpoint image designated by the "2D select", which was explained already, may be extracted to create its thumbnail image or provide thumbnail display.

As long as a 3-dimensional image reproducing apparatus is one that can interpret 3D information as described heretofore, when receiving a file as shown in FIG. 21(b) it can handle the file properly. Now, account should be taken of an old type 3-dimensional image reproducing apparatus that cannot interpret 3D information. This 3-dimensional image reproducing apparatus is one that has no 3D information analyzer 202 or no image converter 203 in FIG. 20 and is not connectable to a 3-dimensional display. This 3-dimensional image reproducing apparatus cannot interpret 3D information, hence cannot tell whether the image information stored in the file is for a 2D image or 3D image. Even though the file has been found to hold a 3D image by some unspecified means, it is impossible for the apparatus to reproduce the image information correctly because it has no image converter.

Even in such a case, if thumbnail images have been recorded in accordance with the aforementioned DCF standard or a similar idea, at least display of the thumbnail images can be expected.

Thereupon, in the present invention, a thumbnail image embedded with a symbol indicating that the file contains a 3D image is recorded. For example as shown in FIG. 23(a), an image with a pictorial symbol "3D" overwritten at the lower right thereof may be used as a thumbnail image, or as shown in FIG. 23(b), an image embedded with transparent text "3D" in the center thereof may be used as a thumbnail image. Alternatively, if an image as shown in FIG. 23(c) is recorded as a thumbnail image, it is at least possible to recognize that the file is one that contains a 3D image.

When a symbol that represents 3D content is embedded in the thumbnail image, it is possible to permit the user to select the position and size of the symbol to be embedded at the time of recording. Further, it is also possible to allow for selection of a desired symbol from a plurality of symbols prepared beforehand. Moreover, a background area is automatically located upon creation of a thumbnail image, so that a symbol may be written into the background area. In addition, when the symbol for representing 3D content is automatically embedded in the thumbnail image as stated above, it is possible to permit the user to check the once recorded thumbnail image and recreate the thumbnail image if the position and/or size of the symbol is unpreferable.

FIG. 24 shows combination examples of the primary image and its thumbnail image of an image file thus recorded. Here, similarly to the case of FIG. 22, it is assumed that a joined image composed of two viewpoint images, reduced to half in the horizontal direction as shown in FIG. 4(e) is stored as the primary image and that its pixel size is 640 pixels×480 pixels. Also, it is also assumed that an image, reduced from the primary image, down to 160 pixels×120 pixels and embedded with a symbol indicating the inclusion of a 3D image, is used as a thumbnail image. With this assumption, storage of a thumbnail image as shown in FIG. 23(c) produces a combination as shown in FIG. 24(a) and storage of a thumbnail image shown in FIG. 23(b) produces a combination shown in FIG. 24(b).

The symbol in itself may be text, a mark or particular image as long as it can indicate the existence of 3D content. Also, there is no limitation on the position of the symbol in the thumbnail image. However, in either case, the symbol has to be recorded as part of the thumbnail image. Conversely, the symbol is not one that is recorded separately from the thumbnail image.

This is the key. In order to provide effective thumbnail display in a 3-dimensional image reproducing apparatus that cannot interpret 3D information, it is necessary to record an image shown in FIG. 23, in advance, in the file, as a thumbnail image. This arrangement makes it possible for the 3-dimensional image reproducing apparatus to allow for check of image content of 3D image files in the same manner as 2D image files by reproducing their thumbnail images, hence discriminate between 2D image files and 3D image files.

Incidentally, even a 3-dimensional image reproducing apparatus capable of interpreting 3D information does not always support all kinds of data formats. For example, a 3-dimensional image reproducing apparatus that supports only 3D images of a four-lens system cannot provide correct display if it receives 3D image data of a twin lens system. In such a case, the image content can be checked by display of thumbnail images. Since a 3-dimensional image reproducing apparatus capable of interpreting 3D information is able to judge whether the primary image contained in a file is correctly reproducible, by analyzing the 3D information, the apparatus can be configured to display a thumbnail image if a file has an invalid data format which cannot be reproduced correctly and also display a message or the like, informing that "the file has an unsupported 3D data format".

THE FIFTH EMBODIMENT

Figure 28:
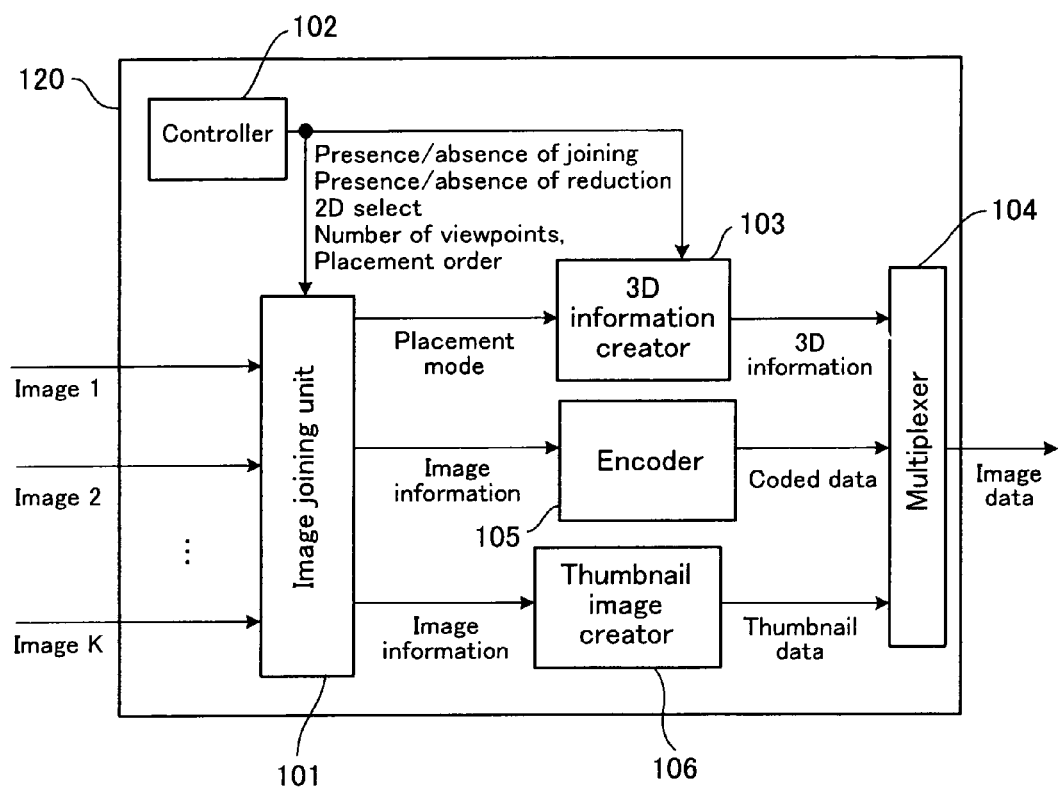
FIG. 28 is a diagram showing a configuration of a 3-dimensional image creating apparatus which records a thumbnail image into a file in the fifth embodiment.

Now, FIG. 28 shows the example of a 3-dimensional image creating apparatus for recording a thumbnail image in a file. A 3-dimensional image creating apparatus 120 in FIG. 28 has a thumbnail image creator 106 and creates a file by multiplexing thumbnail data together with coded data (or uncompressed image information) and 3D information in a multiplexer 104. The output of the file can be delivered to recording devices such as IC memories, magneto-optical disks, magnetic tape, hard disks and the like, and/or communications devices such as LAN, modems and others. Though the size of a thumbnail image in the DCF standard is defined as 160 pixels×120 pixels, general thumbnail images are not limited to this size.

THE SIXTH EMBODIMENT

Figure 26:
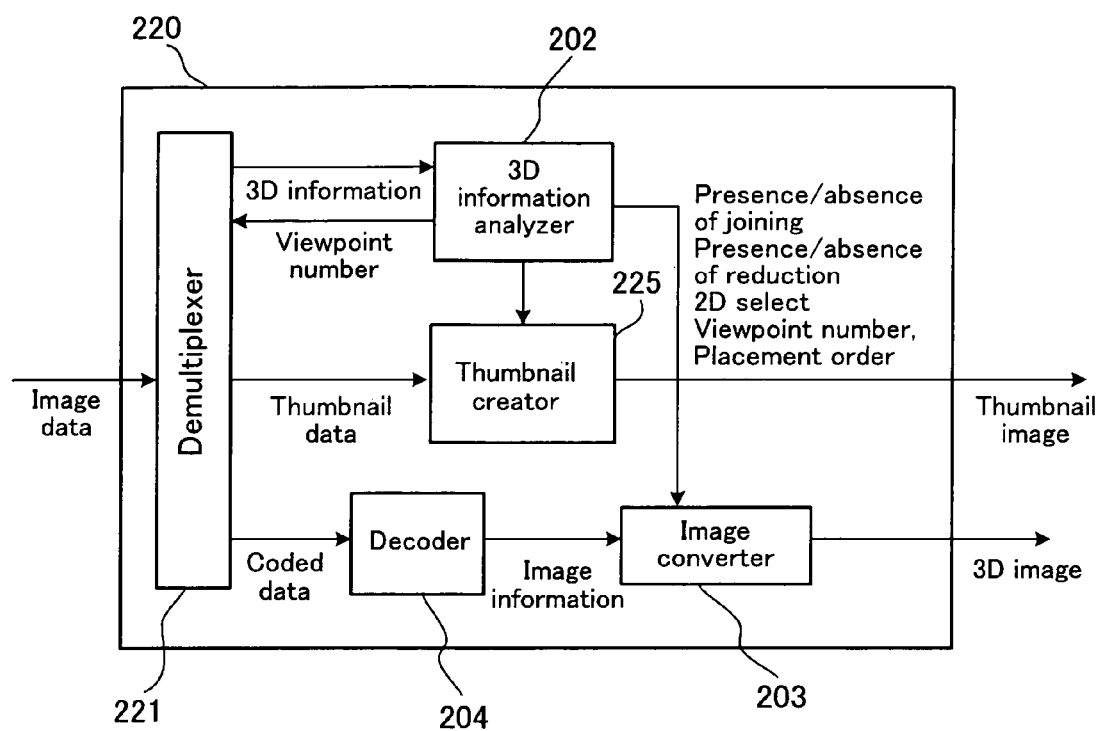
FIG. 26 is a diagram showing a configuration of a 3-dimensional image reproducing apparatus for reproducing files recorded with a thumbnail in the sixth embodiment.

Next, FIG. 26 shows the example of a 3-dimensional image reproducing apparatus for implementing thumbnail display as shown in FIG. 23 from the thumbnail images as shown in FIG. 22. In FIG. 26, the components having the same functions as those in the 3-dimensional image reproducing apparatus 210 in FIG. 20 are allotted with the same reference numerals and the description is omitted. In a 3-dimensional image reproducing apparatus 220 as shown in FIG. 26, thumbnail data is separated by a demultiplexer 221. If the data to be reproduced represents a 3D image, a thumbnail creator 225, in accordance with the instruction from a 3D information analyzer 202, implements thumbnail display of a thumbnail image, decoded from the thumbnail data (no decoding is needed if data is uncompressed) by superimposing a symbol indicating the fact of a 3D image. If the thumbnail is displayed in 3D, thumbnail creator 225 implements the same process on the thumbnail image as the way in which image converter 203 makes conversion of the primary image.

THE SEVENTH EMBODIMENT

Figure 27:
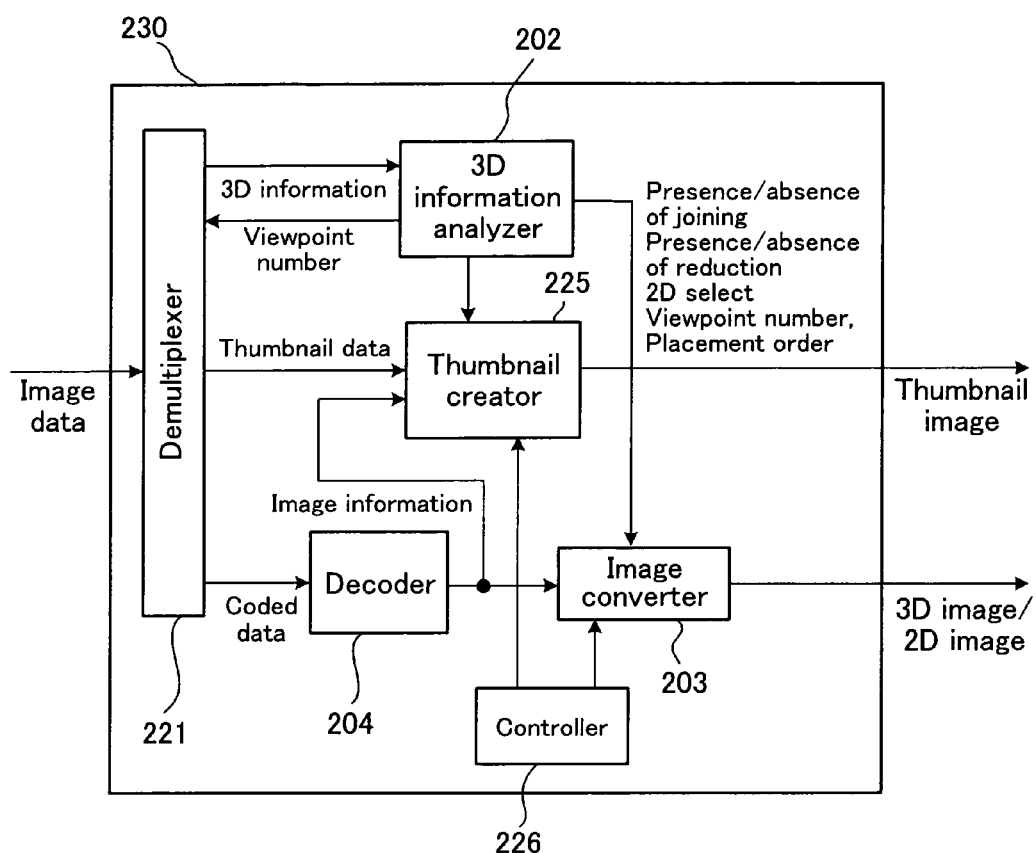
FIG. 27 is a diagram showing a configuration of a 3-dimensional image reproducing apparatus which is switchable between 3D display and 2D display in the seventh embodiment.

FIG. 27 shows the example of a 3-dimensional image reproducing apparatus which can output a 3D display image and a 2D display image in a switchable manner. In FIG. 27, the components having the same functions as those in the 3-dimensional image reproducing apparatus 220 in FIG. 26 are allotted with the same reference numerals and the description is omitted. In a 3-dimensional image reproducing apparatus 230 shown in FIG. 27, when encoded image data of the primary image and thumbnail image as shown in FIG. 24 is input, the image information decoded by decoder 204 is sent to image converter 203 as well as to thumbnail creator 225. A controller 226 gives instructions of whether a 3D display image or 2D display image is to be output, to image converter 203 and thumbnail creator 225. When the thumbnail is to be displayed in 2D, thumbnail creator 225 may directly output the thumbnail image as shown in FIG. 24 (in this case, the symbol representing 3D is also displayed) or may output a thumbnail image without any symbol indicating the fact of 3D by reducing the input primary image and implementing a similar process to that of image converter 203. If the thumbnail is displayed in 3D, the input primary image may and should be reduced and then subjected to the same process as in image converter 203.

In the description heretofore, a 3D file is configured so that its thumbnail image is displayed with a superimposed symbol that indicates the fact of 3D. However, it is possible to display the thumbnail image as it is for a 3D file while display of the thumbnail image of a 2D file may be performed by superimposing a symbol that indicates 2D.

Further, not only display of a symbol that indicates the 3D over the thumbnail image of a 3D file, but also display of the data contained in the 3D information, such as the number of viewpoints, viewpoint numbers and others, may be superimposed on the thumbnail image. Moreover, display of the data contained in 3D information and the symbol indicating the fact of 3D may be superimposed on the thumbnail image but may be given at a predetermined position near the thumbnail image.

FIG. 25 shows other examples of thumbnail images stored in the file. The thumbnail image is composed of a first image made up of two or more images from different viewpoints and a second image that is created from the first image by cutting out one viewpoint image and the two are then fitted in a picture-in-picture manner. In FIG. 25(a), the first image is to be a main-image and the second image is to be a sub-image. As shown in FIG. 25(b), the main-image and sub-image can be interchanged. FIG. 25(c) and FIG. 25(d) show the respective images of FIG. 25(a) and FIG. 25(b), each embedded with a symbol that indicates the fact of 3D. As to FIGS. 25(c) and (d), the symbol indicating the fact of 3D may be output and superimposed upon display of thumbnails, instead of its being recorded in the thumbnail image. Use of thumbnail display as shown in FIG. 25 allows for both checking of the image content with a distortion-free image and confirmation of the actual image form recorded as a primary image.

The embodiment of the present invention will be described hereinbelow with reference to the drawings.

THE EIGHTH EMBODIMENT

In the eighth embodiment of the present invention, using GUI application software for 3-dimensional image display, a personal computer (to be abbreviated as PC, hereinbelow) implements a stereoscopic display process to implement stereoscopic display on a stereoscopic display. Specifically, the CPU on the PC performs processing of a motion picture and/or a still image, in accordance with the stereo display application software recorded on a recording medium such as a CD-ROM, hard disk and the like, to implement stereoscopic display on the stereoscopic display. Further, as the user gives instructions for stereo processing through a mouse or a keyboard, the CPU executes the process based on the instructions.

Figure 29:
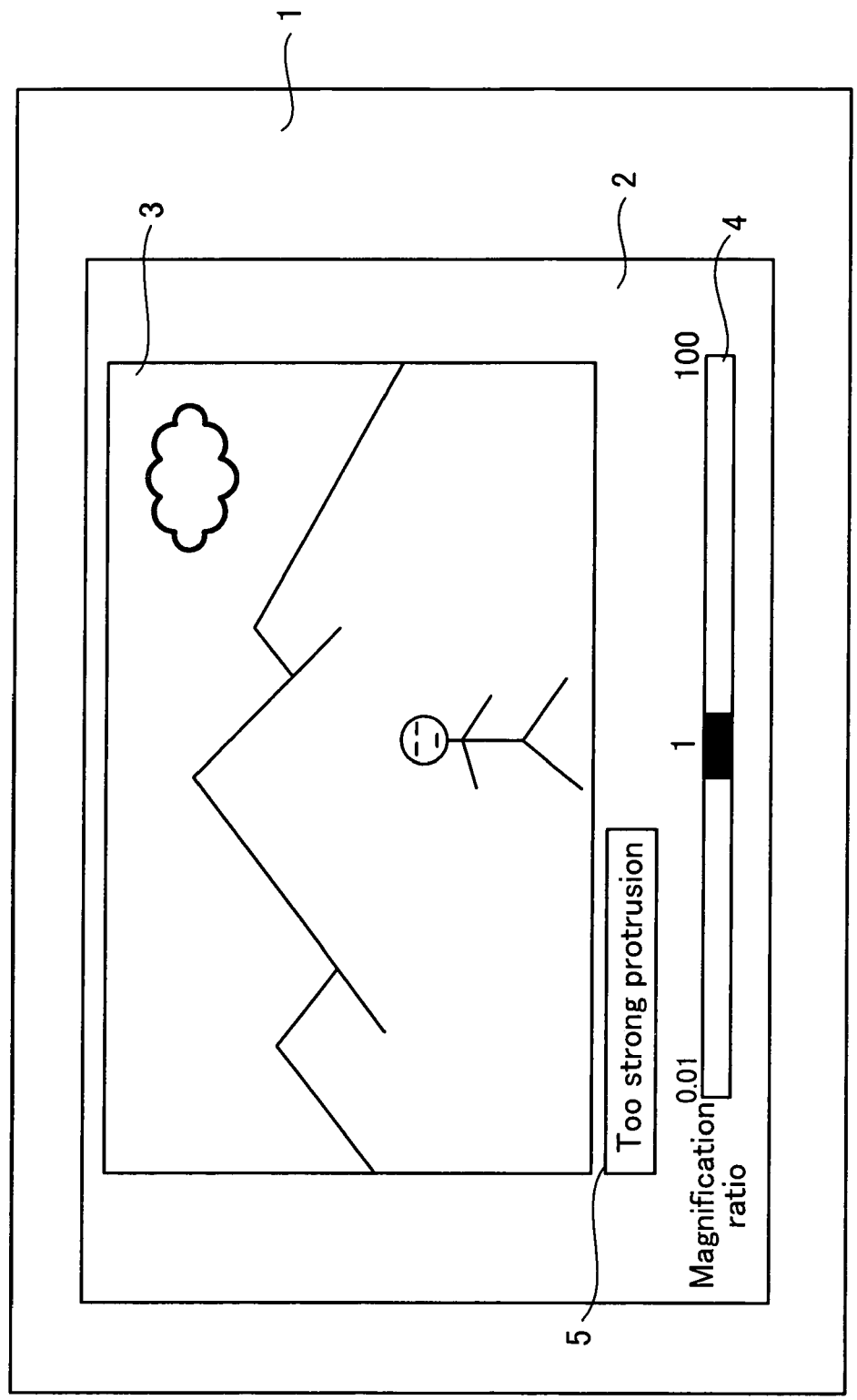
FIG. 29 is an illustrative diagram showing a GUI image frame of a 3-dimensional image in the eighth embodiment.

FIG. 29 is a diagram for explaining a display image on a stereoscopic display of the eighth embodiment, in which a management display image 2 is displayed on display 1 by the 3-dimensional image display application. Management display image 2 of the 3-dimensional image display application is composed of a 3-dimensional image display area 3, a magnification ratio adjustment bar 4 and a warning display area 5.

Figure 39:
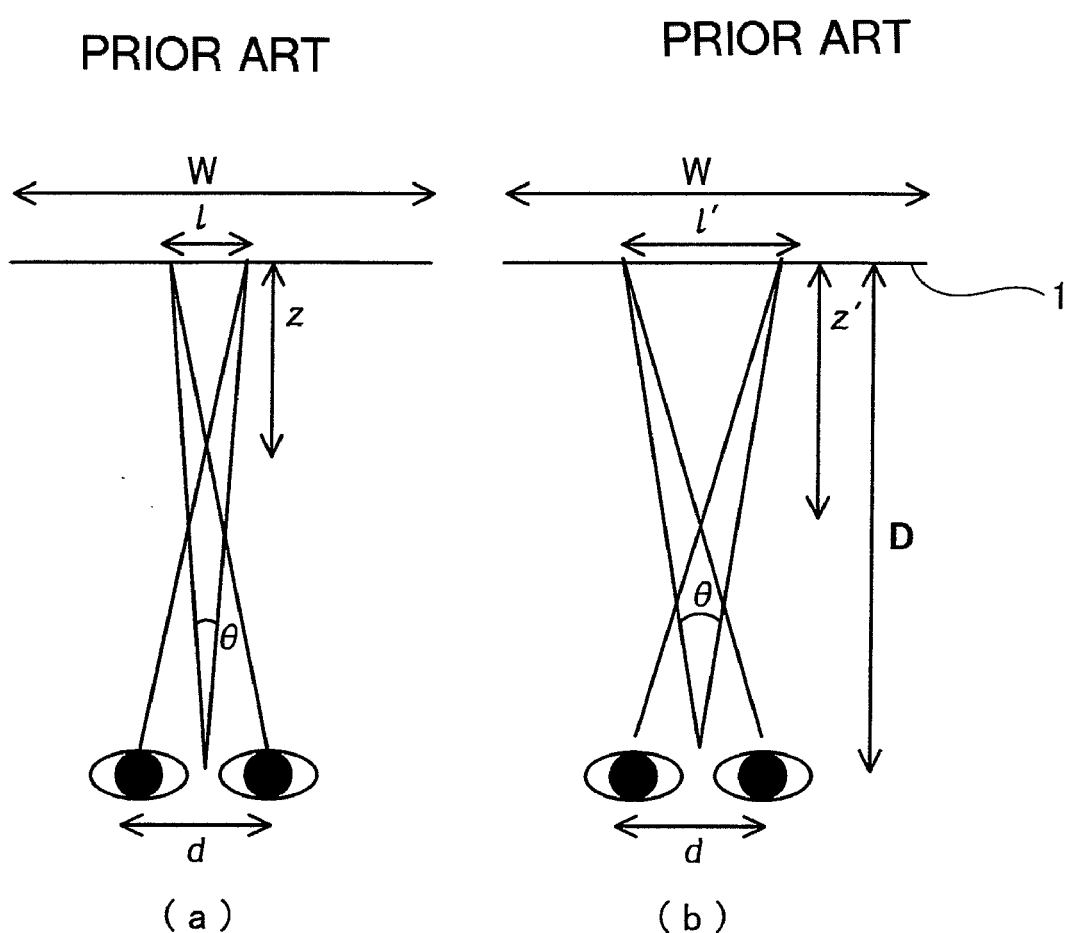
FIG. 39 is a diagram for explaining protrusion of a 3-dimensional image.
Figure 40:
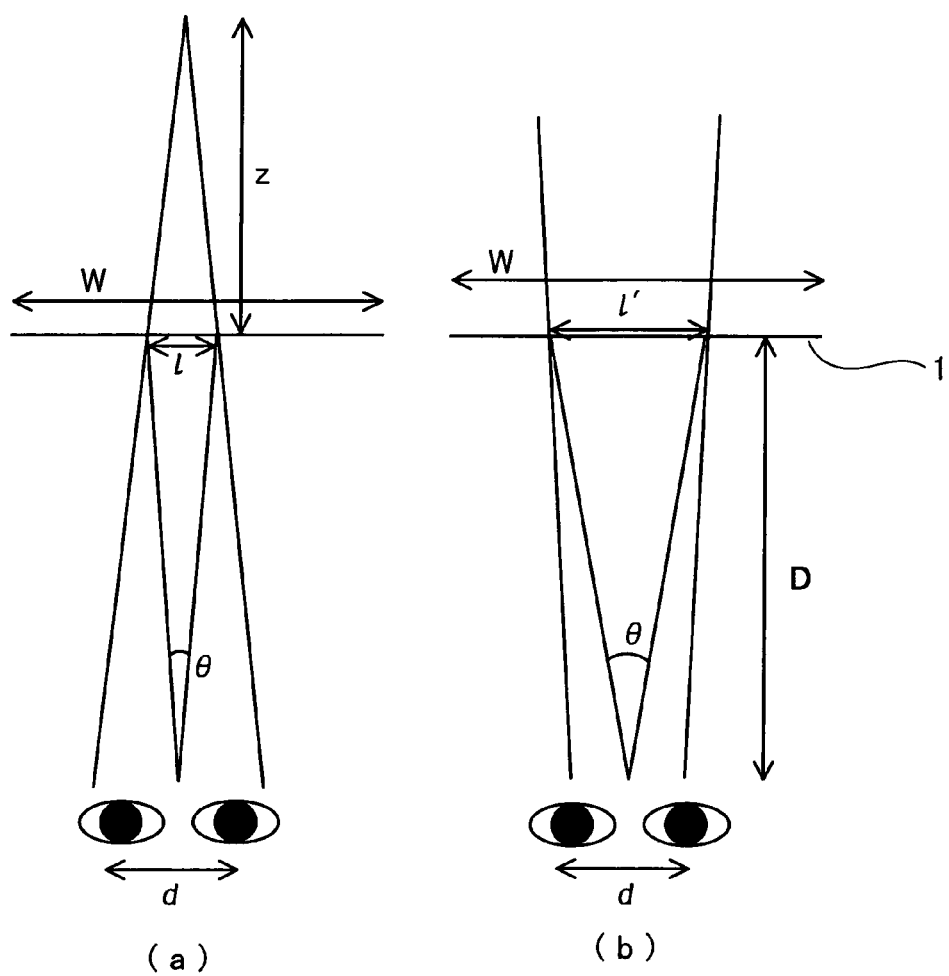
FIG. 40 is a diagram for explaining depth of a 3-dimensional image.

As understood from FIGS. 39 and 40 used for description of the prior art, when a 3-dimensional image is enlarged and displayed, both the amount of protrusion projected forward from the stereoscopic display and the amount of depth depressed interior-ward with respect to the stereoscopic display are magnified, and when they become greater than their corresponding certain thresholds, it is impossible to produce a stereoscopic view. At this occasion, if the maximum amounts of protrusion and depth of the 3-dimensional image are known in advance, it is possible to determine to what extent the amounts of protrusion and depth of the 3-dimensional image change depending on the enlargement ratio, from Eqs. (1) and (2). In the present embodiment, if, for example, protrusion of the 3-dimensional image becomes stronger and hence a long watching-hours could cause a burden on the user, a warning is given to the user.

Figure 30:
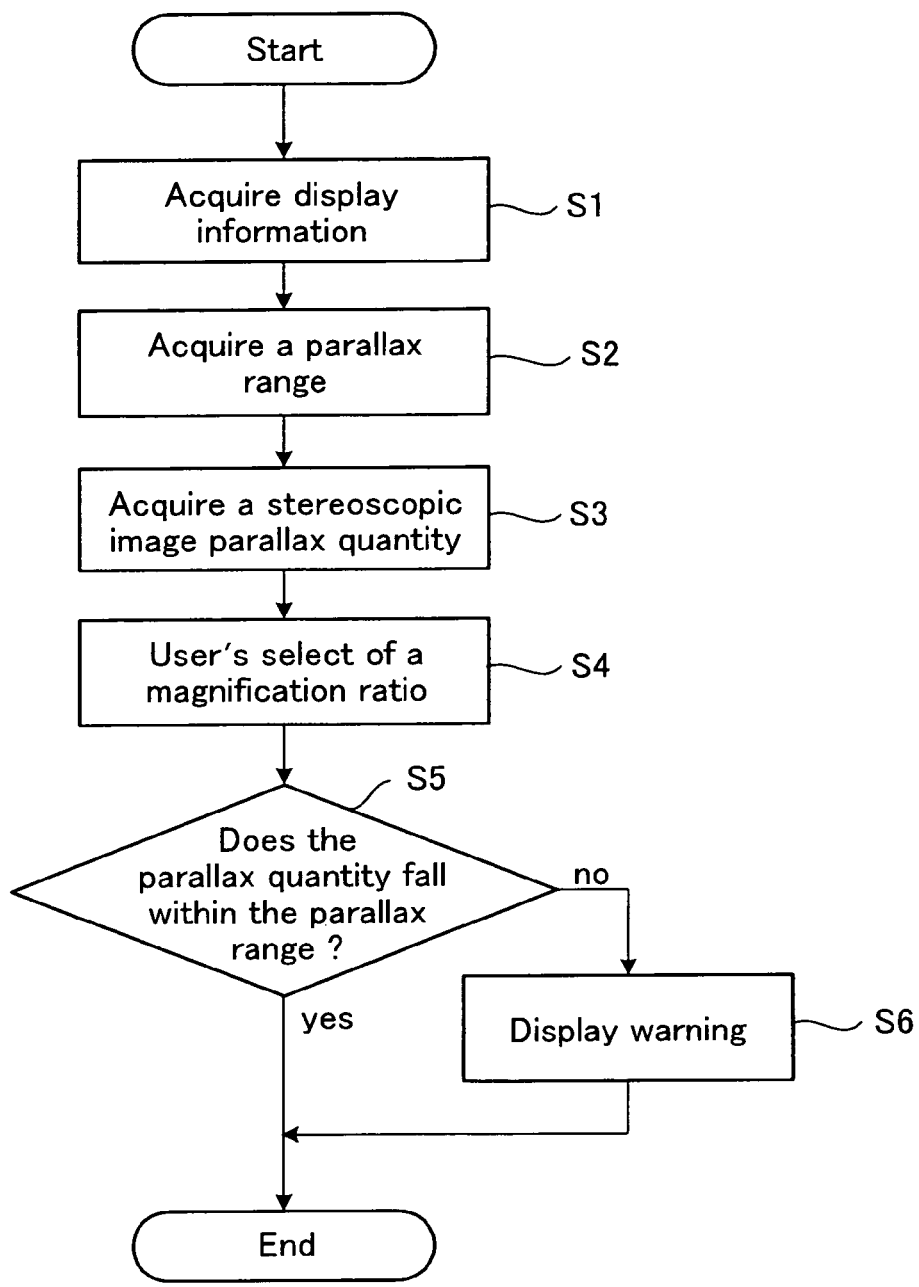
FIG. 30 is a flowchart showing the process in the eighth embodiment.

Referring next to a flowchart shown in FIG. 30, the processing flow of the eighth embodiment will be described.

At Step S1, display information is acquired. The display information mentioned here includes width W[m] of the display, resolution P[dot] of the display and distance D[m] between the user and the display. The distance between the user and the display may be obtained exactly using a position sensor or the like. However, it is more convenient to use a value from a database or the like, in which general distances to the user related to the sizes and types of the display, have been accumulated beforehand, as an example the distance to the user maybe as much as 1 meter if the display size is 15 inches.

As to the stereoscopic displays for producing stereoscopic effect by projecting different images on the left and right eyes, there occurs no mixture between the left and right images when absolutely independent display devices are used for the left and right eyes as in the case of HMD. However, in stereoscopic displays based on the parallax barrier system and lenticular system, a slight component of the image for the user's right eye may mix with the image to be viewed by the left eye. This is called crosstalk. In general, the less crosstalk, the more excellent the stereoscopic display is. As crosstalk becomes greater, the range for permitting the comfortable stereoscopic view becomes narrower. For this reason, information as to crosstalk is included into the display information, and when crosstalk is strong as will be described hereinbelow, the range of parallax may be made small so as to provide comfortable stereovision on the stereoscopic display.

For this purpose, a parallax range for permitting the stereoscopic view is acquired at Step S2.

The CPU of the PC calculates the parallax quantity $\theta$ in the range for permitting the comfortable stereoscopic view based on the disparity between the left and right images, using Eqs. (1), (2) and (3), so as to determine the amount of protrusion th_f [dot] and the amount of depth th_b [dot] falling in the range for permitting the comfortable stereoscopic view. Here, th_f and th_b are represented by the distances (parallax) between left and right counterpart points on the stereoscopic display screen. As apparent from FIGS. 39 and 49, in an image that protrudes forward from the screen, the left-eye image is located to the right with respect to the right-eye image whereas the left-eye image is located to the left with respect to the right-eye image, in an image that sets back from the screen. Hence, in the present invention, the extent of disparity of the right-eye image from the left-eye image as a reference is determined so that a positive value of parallax will represent a protrusion (the left-eye image located on the right) and a negative value of parallax will represent a depth (the left-eye image located on the left).

The range in which the value of parallax falls from th_f to th_b, can be said to be the maximum parallax range of stereoscopic display for permitting the comfortable stereoscopic view, and th_f and th_b represent the thresholds of the maximum parallax range.

The parallax quantity $\theta$ for permitting the comfortable stereoscopic view has been empirically determined by various studies and is known that it has correlation with the size of the stereoscopic display and crosstalk. For example, when it is assumed that the range of $\theta$ that permits the comfortable stereoscopic view in a 15-inch stereoscopic display is 35 minutes for both protrusion and depth and the distance between user's eyes is 60 mm, the thresholds that specify the maximum parallax range for stereoscopic display are about th_f=25 and th_b=−25 [dot]. Accordingly, the parallax range that permits the stereoscopic view is $-25 \leq \theta \leq 25$. Naturally, these values change depending on the information as to the display acquired at S1. In addition, since these values are determined at best empirically, instead of using Eqs. (1), (2) and (3), it is naturally considered that CPU may use the experimentally obtained measurement of display performance of stereoscopic displays, which has been stored beforehand in a database or the like.

At Step S3, the maximum amount of protrusion f [dot] and maximum amount of depth b [dot] of a 3-dimensional image to be displayed, in one word, the maximum parallax quantity of a 3-dimensional image is acquired from the tag information of the 3-dimensional image. Here, tag information refers to additional information, separately attached to a 3-dimensional image, such as conditions of shooting when the image was taken. In the present embodiment, it is assumed that the information on the maximum amount of protrusion and maximum amount of depth of a 3-dimensional image is given in advance as tag information. However, there is a method of automatically determining the information on f and b by stereo matching, meaning that the method of acquisition is not limited to use of tag information. Also in this case, f and b are represented as the parallax quantities on the stereoscopic display screen. These values denote the range of parallax (parallax range) of a 3-dimensional image.

At Step S4, the user inputs a ratio E [%] of enlargement or reduction of the 3-dimensional image by means of magnification ratio adjustment bar 4. Input of the magnification ratio is not limited to use of the magnification ratio adjustment bar, but it can be modified by pressing particular board keys, or by use of a scroll bar with a mouse. In addition, the present invention is supposed to not only deal with an enlargement process but also a reduction process, and the ratio for enlargement or reduction is supposed to be obtained at Step S5.

At Step S5, whether the parallax quantity of a 3-dimensional image falls within the parallax range that permits the stereoscopic view is decided. The maximum amount of protrusion f and maximum amount of depth b, both determined at Step S3, are multiplied by the magnification ratio E [%] obtained at Step S4, so as to determine the maximum amount of protrusion f'=Ef [dot] of the enlarged 3-dimensional image and the maximum amount of depth b'=Eb [dot] of the enlarged 3-dimensional image. The resultant values are compared to th_f and th_b determined at Step S3 to decide whether these values fall within the parallax range for permitting the stereoscopic view, at Step S5. If the parallax quantity of the 3-dimensional image falls within the above parallax range, the process is ended. If the parallax quantity of the 3-dimensional image falls out of the parallax range, the operation goes to Step S6.

At Step S6, the CPU of the PC determines a message, such as "too strong protrusion", "too strong depth", "too weak protrusion", "too weak depth" or the like, based on what degree the parallax quantity of the 3-dimensional image is off the parallax range for permitting the stereoscopic view, and displays it on warning display area 5. Here, warning to the user may be given by a voice message, by changing the color of 3-dimensional image display area 3 or by any other method, and should be limited to display of the message on warning display area 5.

Though, in the present embodiment, decision on the amount of protrusion of a 3-dimensional image is made based on the parallax quantity [dot] or the disparity between the counterpart points of the left and right images, obviously, the amount z [m] of the apparent protrusion from the display as shown in FIGS. 39 and 40 may be used for this decision.

THE NINTH EMBODIMENT

The ninth embodiment of the present invention will be described.

Figure 31:
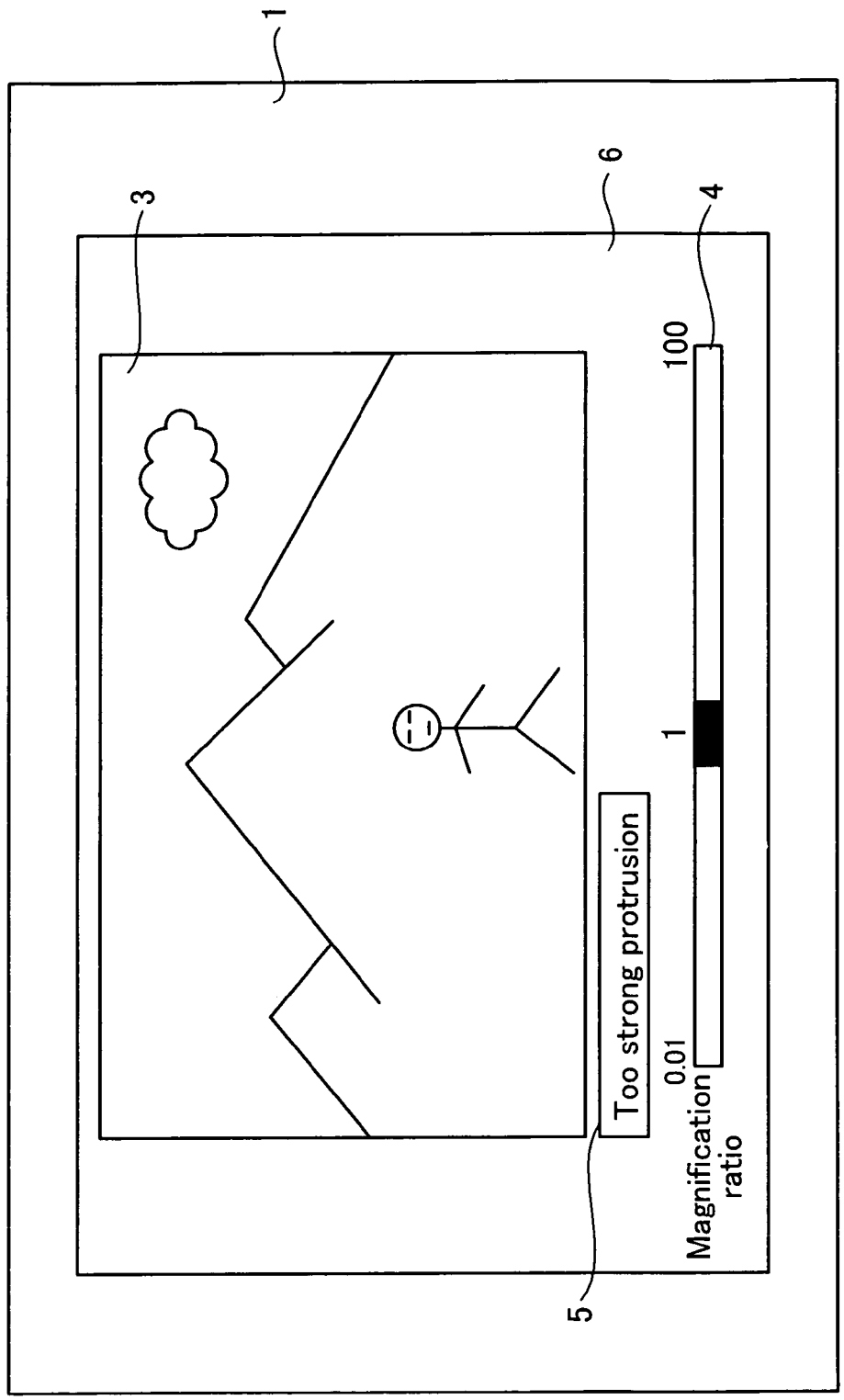
FIG. 31 is an illustrative diagram showing a GUI image frame of a 3-dimensional image in the ninth embodiment.

A management display image 6 of stereoscopic display 1 in the ninth embodiment is composed of a 3-dimensional image display area 3, a magnification ratio adjustment bar 4 and a warning display area 5, as shown in FIG. 31.

The operational flow of the ninth embodiment will be described referring to the flowchart of FIG. 32. Step S1 to Step S5 are identical with the eighth embodiment.

Figure 33:
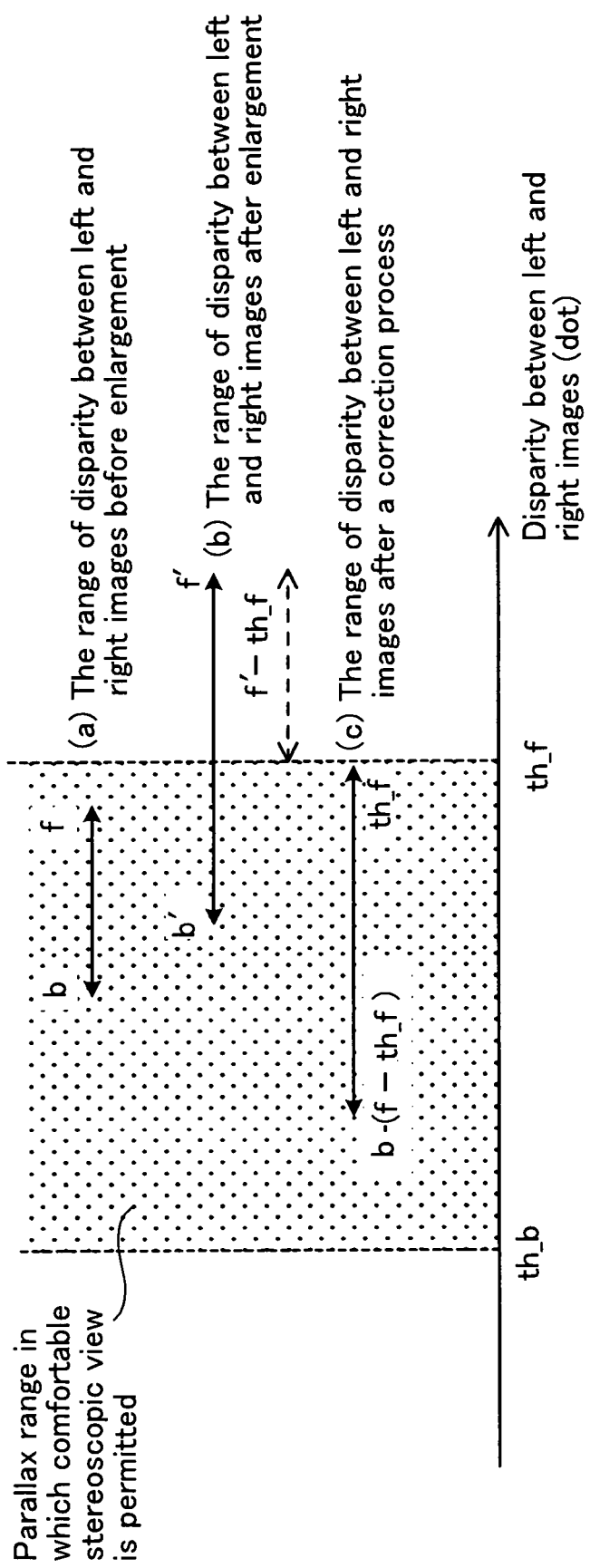
FIG. 33 is an illustrative diagram showing the parallax quantity of a 3-dimensional image in a correction process.
Figure 34:
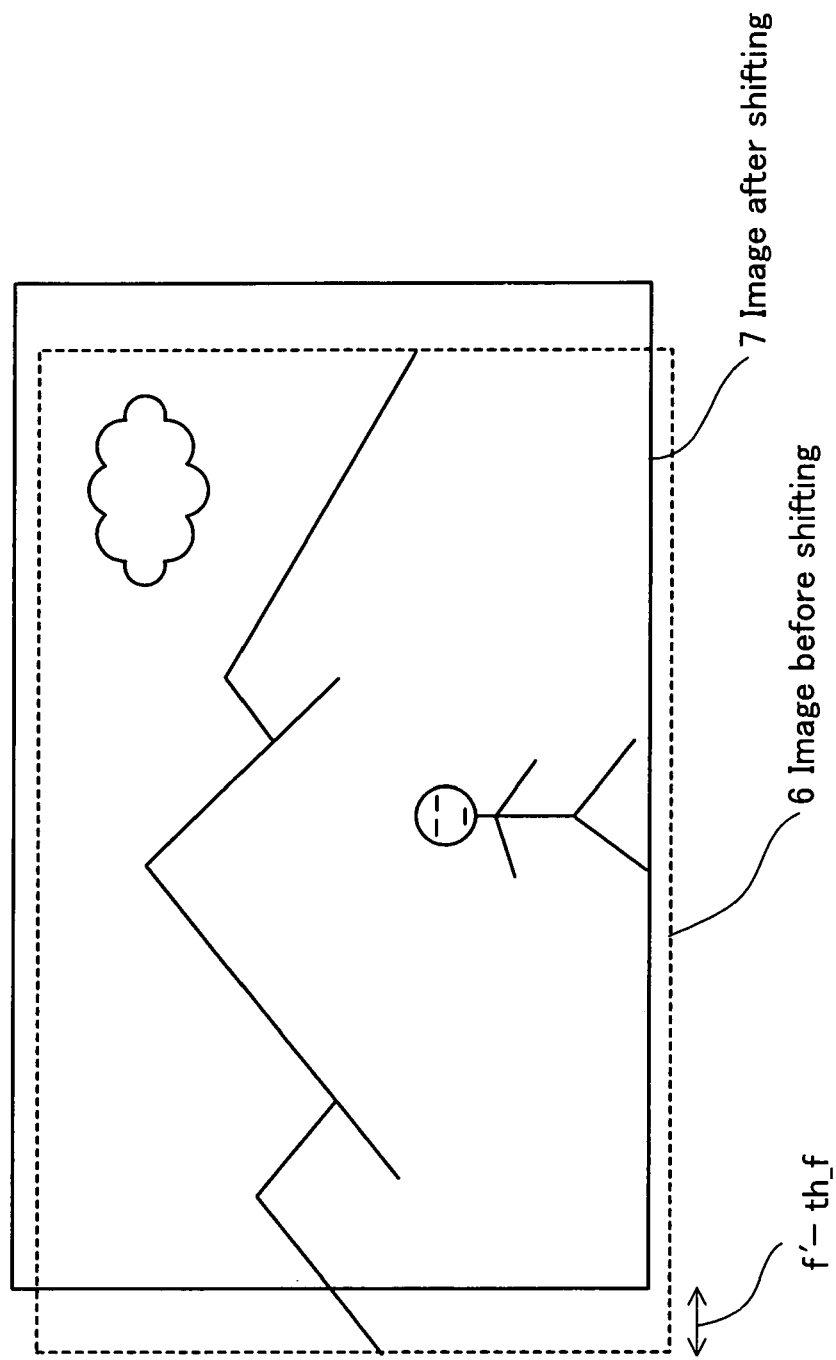
FIG. 34 is a diagram for explaining correction of stereoscopic effect by varying the amount of displacement between left and right images.

At Step S16, correction to the amount of protrusion (parallax quantity adjustment) is made as shown in FIG. 33. FIG. 33(a) shows the parallax range of a 3-dimensional image before enlargement, (b) the parallax range of a 3-dimensional image after enlargement and (c) the parallax range of a 3-dimensional image after a correction process. In FIG. 33, the lateral axis represents the size of the disparity between stereo counterpart points on the left and right images, and hatching represents the range of parallax in which the comfortable stereoscopic view is obtained. Concerning the symbols, f and b represent the maximum amounts of protrusion and depth of a 3-dimensional image before enlargement, and f' and b' represent the maximum amounts of protrusion and depth of the image after enlargement, and th_f and th_b represent the maximum amounts of protrusion and depth, between which the comfortable stereoscopic view can be obtained on the stereoscopic display. Even if the maximum amount of protrusion f' of the image after enlargement is greater than th_f, if f'-b' is smaller than th_f-th_b, the right-eye image as a whole may be shifted by f-th_f as shown in FIG. 34 so as to set back the apparent position of the 3-dimensional image as a whole with respect to the stereoscopic display, to thereby correct stereoscopic effect. In FIG. 34, part 6 enclosed by the broken line represents the original image and part 7 enclosed by the solid line represents the image after shifting. However, if f'-b' is greater than th_f-th_b, it is no longer possible to correct the protrusion by simply shifting the right-eye image as a whole.

Similarly, in the case of handling depth, when the maximum amount of depth b' after enlargement of the image is smaller than th_b and f'-b' is smaller than th_f-th_b, shifting the right-eye image as a whole by b'-th_b to display the entire 3-dimensional image being projected from the stereoscopic display, makes it possible to provide a comfortable stereoscopic view. It should be noted that when the amount of shifting is positive, the right-eye image as a whole is shifted to the right, and when the amount of shifting is negative, the right-eye image as a whole is shifted to the left.

In the present embodiment, though the amount of protrusion of the whole 3-dimensional image is corrected by shifting the right-eye image, the way of shifting is not limited to that of the right-eye image but the left-eye image may be shifted with the right-eye image fixed or both the images are shifted at the same time.

Further, when f'-b' is greater than th_f-th_b, display of "TOO STRONG TO CORRECT" in the warning area or display of one of the left and right images in the 3-dimensional image display area makes it possible to show the user an uncomfortable 3-dimensional image, though provision of warning display area 5 or any other warning is not compulsory.

The embodiment is not limited to the correction of stereoscopic effect upon enlargement, it also possible to enhance the stereoscopic effect of a 3-dimensional image by making the image protrude or set back as a whole when the 3-dimensional image lacks stereoscopic effect as a result of size reduction. For example, when the magnification ratio is smaller than 1 at Step S4, the 3-dimensional image after reduction is shifted by f-f' at Step S16 so as to make the image project forwards with respect to the display and equalize the position of the maximum protrusion after reduction with that before reduction, whereby it is possible to make the 3-dimensional image after reduction give a greater feeling of protrusion or protrude greatly forward from the screen. Conversely, it is also possible to equalize the amount of depth so that the maximum position of protrusion does not remain fixed and the maximum position of depth is fixed.

THE TENTH EMBODIMENT

The tenth embodiment of the present invention will be described.

The tenth embodiment of the present invention is an improvement of the ninth embodiment, in which the protrusion correction process (parallax quantity adjustment) at Step S16 is improved.

This embodiment enables display for easy observation of a stereoscopic view by adjusting the stereoscopic effect giving priority to the central part of the 3-dimensional image even when a comfortable stereoscopic view cannot be obtained by the total shift of a 3-dimensional image. This embodiment takes advantage of the characteristic of the human's sense of vision, or the fact that the human's vision is clearer around the center than the periphery of the viewfield.

Figure 32:
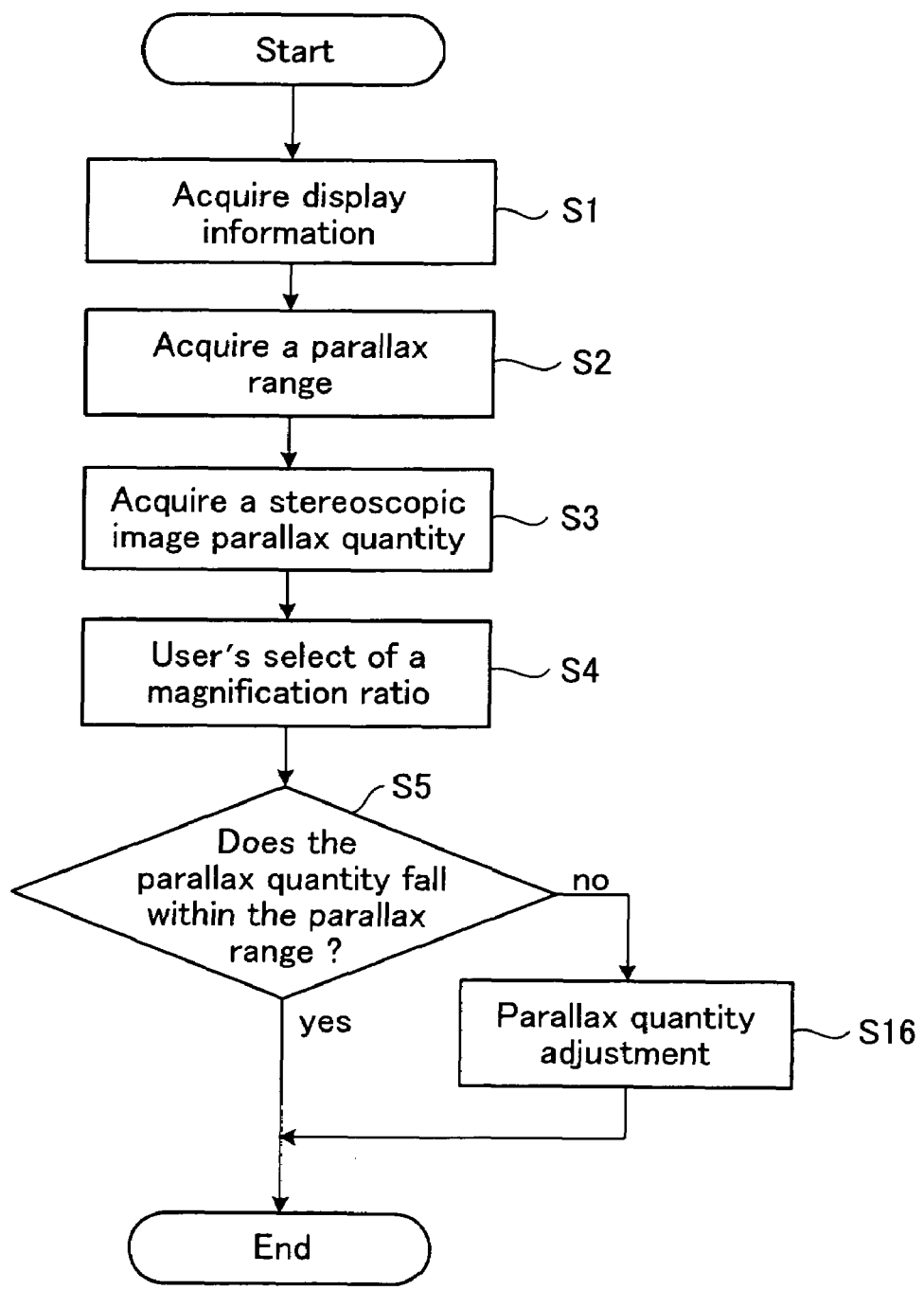
FIG. 32 is a flowchart showing the process in the ninth embodiment.
Figure 35:
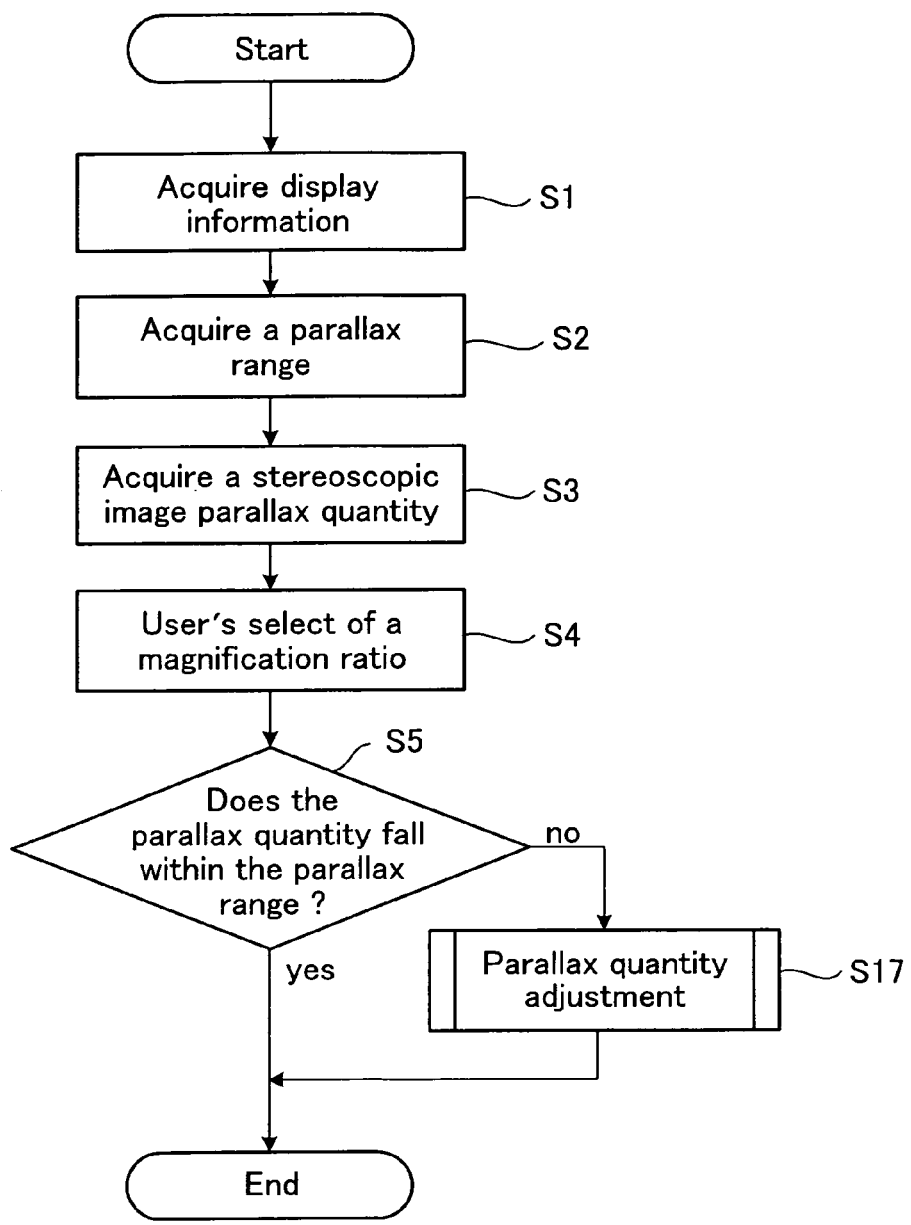
FIG. 35 is a flowchart showing the process in the tenth embodiment.
Figure 36:
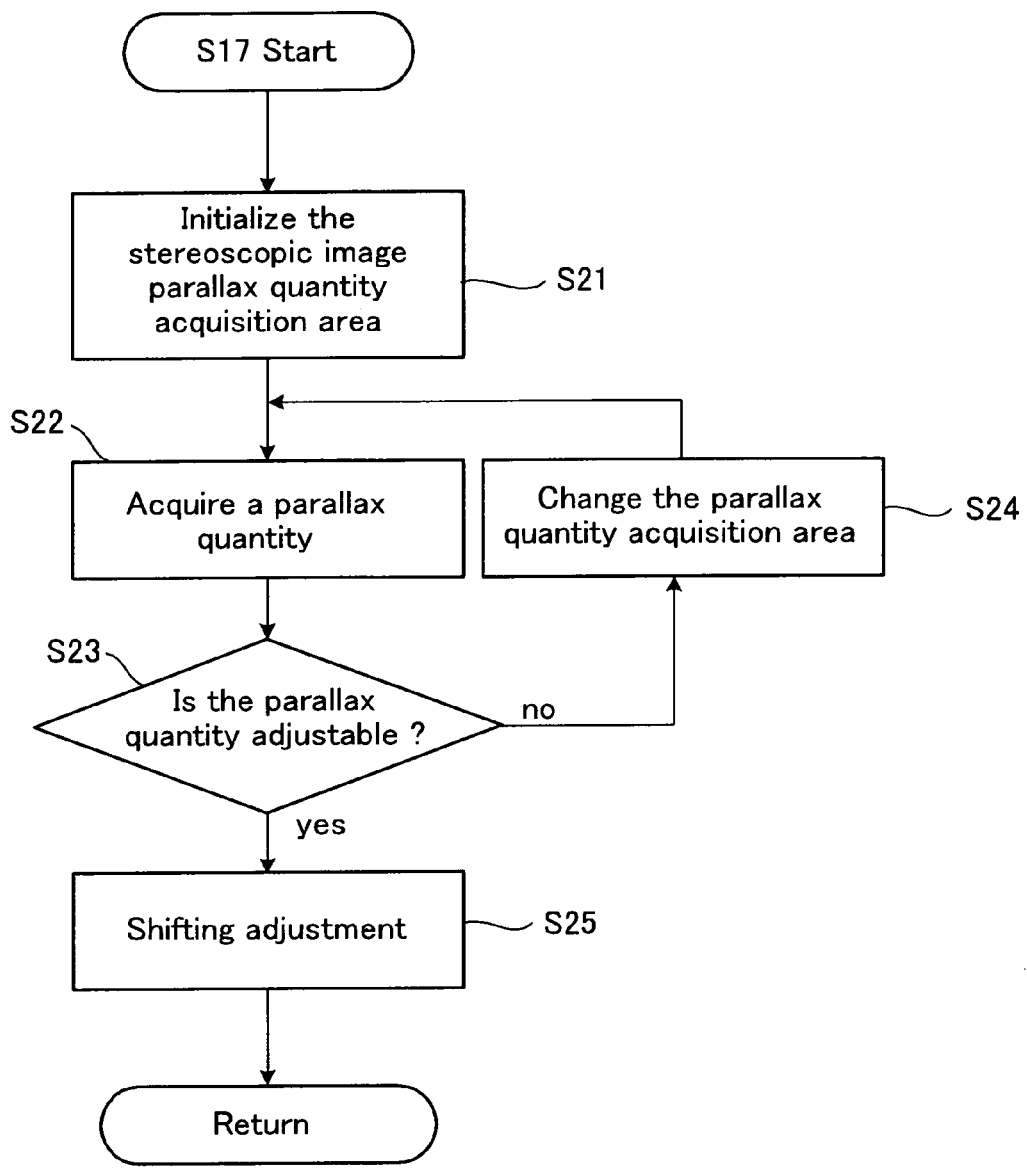
FIG. 36 is a flowchart showing the process at Step 17 in the tenth embodiment.

The tenth embodiment is the same as the ninth embodiment from Steps S1 to S5 in the flowchart shown in FIG. 32 except that the parallax quantity adjustment at Step S16 is replaced by the parallax quantity adjustment at Step S17. Illustratively, the process from Step S21 to Step S26 shown in FIG. 35 is implemented. The flow of this process will be described with reference to the flowchart shown in FIG. 35.

At Step S21, the parallax quantity acquisition area in a target 3-dimensional image to be processed is initialized with the entire image.

At Step S22, the amount of bidashi and the amount of depth are compared every pixel in the parallax quantity acquisition area to acquire the maximum amount of protrusion f' and the maximum amount of depth b' in the parallax quantity acquisition area. In the present embodiment, it is assumed that the information on the amount of protrusion and the amount of depth for every pixel of the image is given in advance as tag information. However, there is a method of automatically determining the amounts for each pixel by stereo matching, meaning that the method of acquisition is not limited to use of tag information. Alternatively, it is not necessary to earn the amounts of protrusion and depth for all pixels; these values may be extracted from some distinctive pixels in the parallax quantity acquisition area.

At Step S23, it is determined whether a stereoscopic view can be obtained by adjusting the parallax quantity by shifting the 3-dimensional image as a whole. It is possible to create display of a comfortable stereoscopic view by setting back the entire 3-dimensional image from the stereoscopic display with a shift of f-th_f' as shown in FIG. 34. However, when f'-b' is greater than th_f-th_b, only a simple shift of the whole image left or right does not work well for correction of protrusion.

Figure 37:
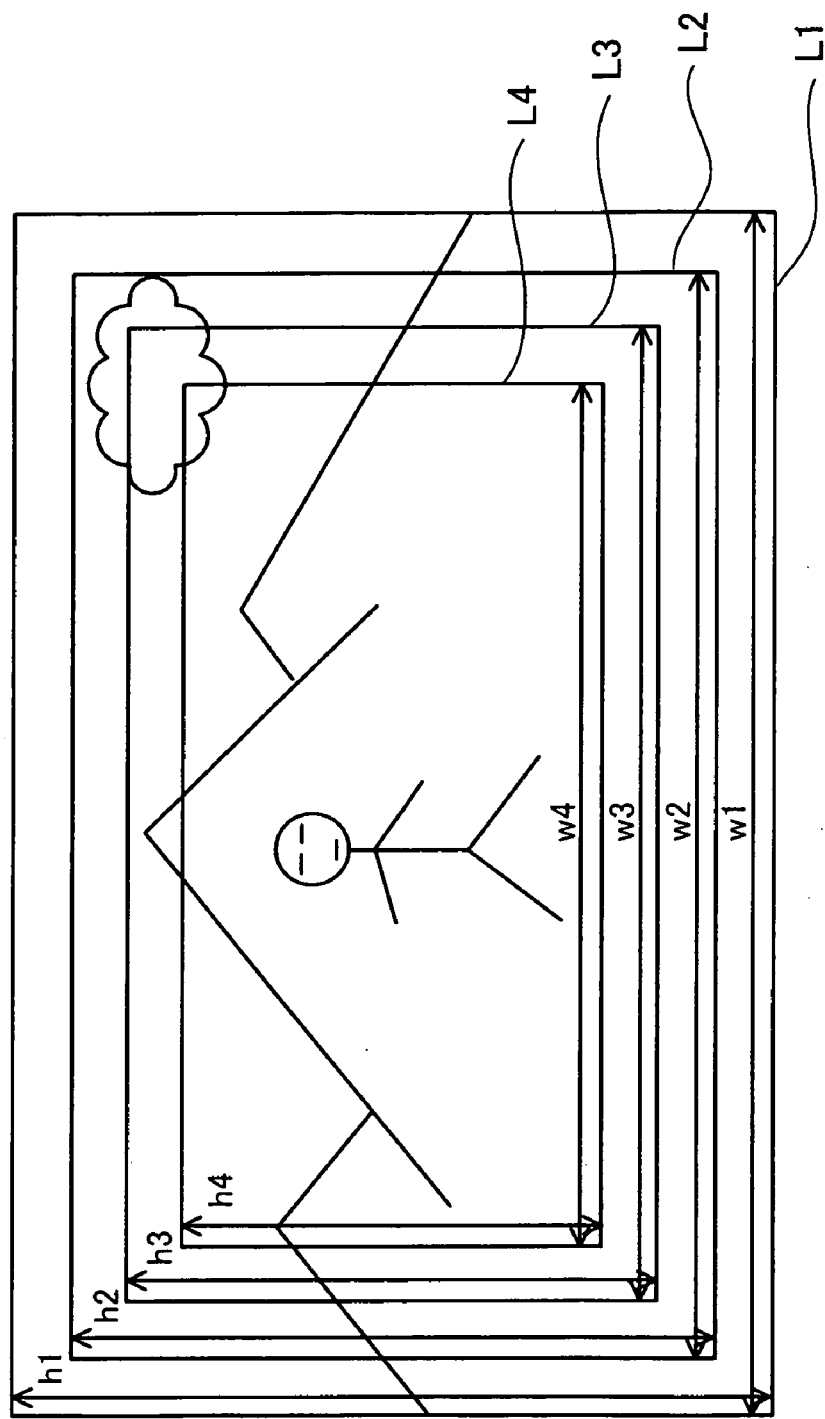
FIG. 37 is a diagram for explaining the method of changing the area for acquiring the parallax quantity.

Accordingly, when f'-b' is greater than th_f-th_b, the CPU of the PC determines that no stereoscopic view can be obtained by adjustment of the parallax quantity, and cuts down the parallax quantity acquisition area at Step S24, and repeats the process from Step S22. In the present embodiment, as shown in FIG. 37, the entire 3-dimensional image is set up as an initial range L1 (width: w1 and height: h2). When no correction process can be made with L1, a revised range L2 (width: w2 and height: h2) is set up for correction. When no correction process can be made with L2, a revised range L3 (width: w3 and height: h3) and so on are set up repeatedly. It is assumed here that wn=0.9×wn−1 and hn=0.9×hn−1, but the recurrence formula should not be limited to this.

In this way, the CPU of the PC makes the parallax quantity adjustment by shifting the 3-dimensional image at Step S25 when it is determined at Step S23 that a stereoscopic view can be obtained by adjustment of the parallax quantity.

Instead of the center of the image frame, as the area in which adjustment of stereoscopic effect is made, an object having the greatest protrusion or the most mark-worthy object is designated beforehand as an observable point, and adjustment as to stereoscopic effect is made giving priority to that observable point and its vicinity, whereby it is possible to create display of a comfortable stereovision.

THE ELEVENTH EMBODIMENT

Any of the embodiments described heretofore is not limited to execution on the applications on PCs, but is executable on TV apparatus, PDAs, cellular phones and others. Application to these will be described hereinbelow as the eleventh embodiment of the present invention.

Figure 38:
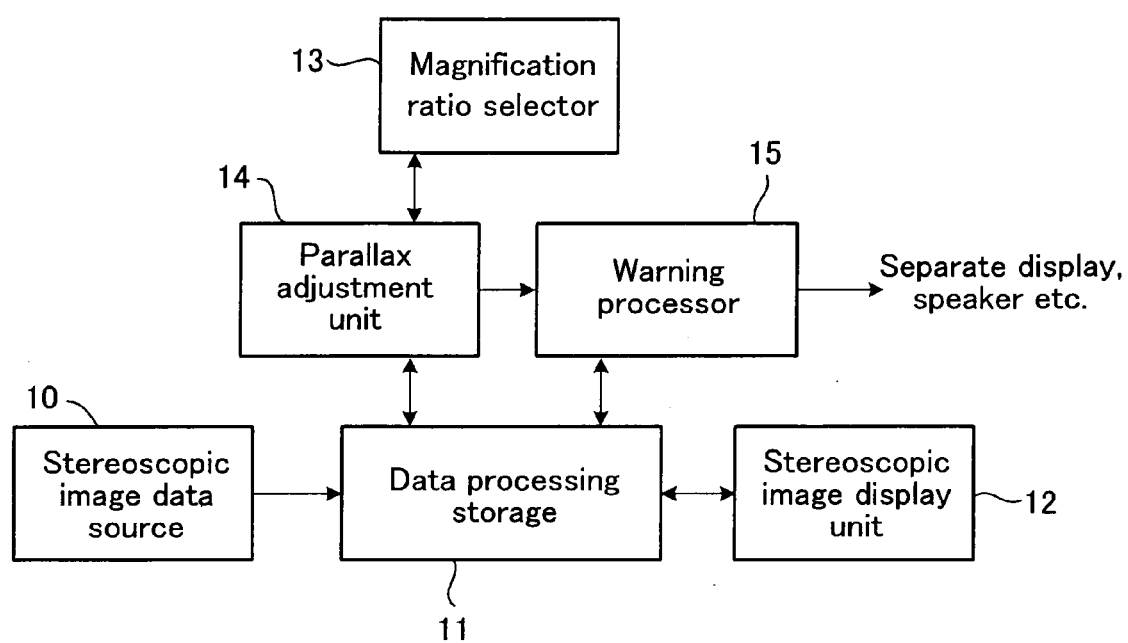
FIG. 38 is a block diagram showing a 3-dimensional image processing apparatus in the eleventh embodiment.

The fourth embodiment is composed of, as shown in FIG. 38, a 3-dimensional image data source 10, a temporary data processing storage 11, a 3-dimensional image display unit 12, a magnification ratio selector 13, a parallax adjustment unit 14 and a warning decision unit 15 and a warning display unit 16.

First, color data and parallax data of 3-dimensional image data for every pixel from 3-dimensional image data source 10, and the size and resolution of the display device and the magnitude of crosstalk from 3-dimensional image display unit 12, are delivered and stored in data processing storage 11. Here, as a 3-dimensional image data source 10, a magnetic disk, semiconductor memory, data transmission via a wired or wireless network, and others can be considered. As a temporary data processing storage, a semiconductor memory, magnetic disk and others built into PDAs, cellular phones etc., can be considered.

Next, the user selects the magnification ratio for display of a 3-dimensional image through magnification ratio selector 13. As the magnification ratio selector 13, buttons, a dial or the like for enlargement and reduction can be considered.

In parallax adjustment unit 14, a similar process to that of Steps S1 to S5 in the eighth embodiment is effected on the 3-dimensional image data stored in data processing storage 11. Specifically, the display information stored in data processing storage 11 is acquired so as to obtain the parallax range in which stereoscopic view of 3-dimensional image data can be obtained, then the parallax quantity of the 3-dimensional image is compared to the parallax range, whereby it is decided whether the parallax quantity of the 3-dimensional image falls within the parallax range for permitting stereovision.

If it falls out of the parallax range for permitting stereoscopic view, warning processor 15 gives a warning on 3-dimensional image display unit 12. The wording for display of warning is stored in data processing storage 11, and warning processor 15 makes a judgment based on the extent the parallax quantity of the 3-dimensional image deviates from the parallax range for permitting the stereoscopic view. In this way, the wording for warning is once stored in data processing storage 11 and is overlay displayed on 3-dimensional image display unit 12 to give a warning.

Warning may be given using a separate dedicated warning indicator other than 3-dimensional image display unit 12 or may be given with warning sound or the like by using a speaker or headphone.

INDUSTRIAL APPLICABILITY

The present invention provides a 3-dimensional image creating apparatus and a 3-dimensional image processing apparatus for displaying 3-dimensional images, and enables the user to confirm the content of 3-dimensional images in a proper manner and is suitable for an apparatus that presents the content of a 3-dimensional image to the user even if it is enlarged or reduced.

The invention claimed is:

1. A 3-dimensional image creating apparatus comprising:
   a primary image creator for creating a primary image including image information for multiple viewpoints;
   a thumbnail image creator for creating a thumbnail image;
   a 3-dimensional control information creator for creating 3-dimensional control information for implementing 3-dimensional display of the primary image; and
   a multiplexer for multiplexing the primary image, the thumbnail image and the 3-dimensional control information.

2. The 3-dimensional image creating apparatus according to claim 1, wherein the thumbnail image creator creates the thumbnail image by directly reducing the primary image.

3. The 3-dimensional image creating apparatus according to claim 1, wherein the thumbnail image creator creates the thumbnail image by extracting a section of one viewpoint image from the primary image.

4. The 3-dimensional image creating apparatus according to claim 1, wherein the thumbnail image creator embeds a symbol that indicates an inclusion of a 3-dimensional image into the thumbnail image.

5. The 3-dimensional image creating apparatus according to claim 1, wherein the thumbnail image creator creates the thumbnail image made up of a reduced image of the primary image and a reduced image of one viewpoint image extracted from the primary image and fitted therein in a picture-in-picture manner.

6. A 3-dimensional image reproducing apparatus, comprising:
   a demultiplexer for separating a primary image data, a thumbnail data and a 3-dimensional control information from an input image data; and
   a thumbnail creator for outputting a thumbnail with a symbol that indicates an inclusion of a 3-dimensional image overlaid on the thumbnail data when the primary image data represents a 3-dimensional image.

7. A 3-dimensional image creating apparatus comprising:
   a primary image creator for creating a primary image including image information for multiple viewpoints;
   a thumbnail image creator for creating a thumbnail image;
   a 3-dimensional control information creator for creating 3-dimensional control information for implementing 3-dimensional display of the primary image wherein the 3-dimensional control information includes the number of viewpoints, the image placement order, the image placement mode, 2D select, and the presence or absence of joining and reduction; and a multiplexor for multiplexing the primary image, the thumbnail image and the 3-dimensional control information.

8. The 3-dimensional image creating apparatus according to claim 7, wherein the thumbnail image creator creates the thumbnail image by directly reducing the primary image.

9. The 3-dimensional image creating apparatus according to claim 7, wherein the thumbnail image creator creates the thumbnail image by extracting a section of one viewpoint image from the primary image.

10. The 3-dimensional image creating apparatus according to claim 7, wherein the thumbnail image creator embeds a symbol that indicates an inclusion of a 3-dimensional image into the thumbnail image.

11. The 3-dimensional image creating apparatus according to claim 7, wherein the thumbnail image creator creates the thumbnail image made up of a reduced image of the primary image and a reduced image of one viewpoint image extracted from the primary image and fitted therein in a picture-in-picture manner.

12. The 3-dimensional image reproducing apparatus according to claim 6, wherein the 3-dimensional control information includes the number of viewpoints, the image placement order, the image placement mode, 2D select, and the presence or absence of joining and reduction.

* * * * *